Dec. 8, 1931.  K. J. E. HESSELMAN  1,835,490
INTERNAL COMBUSTION ENGINE
Filed Aug. 6, 1930  10 Sheets-Sheet 1
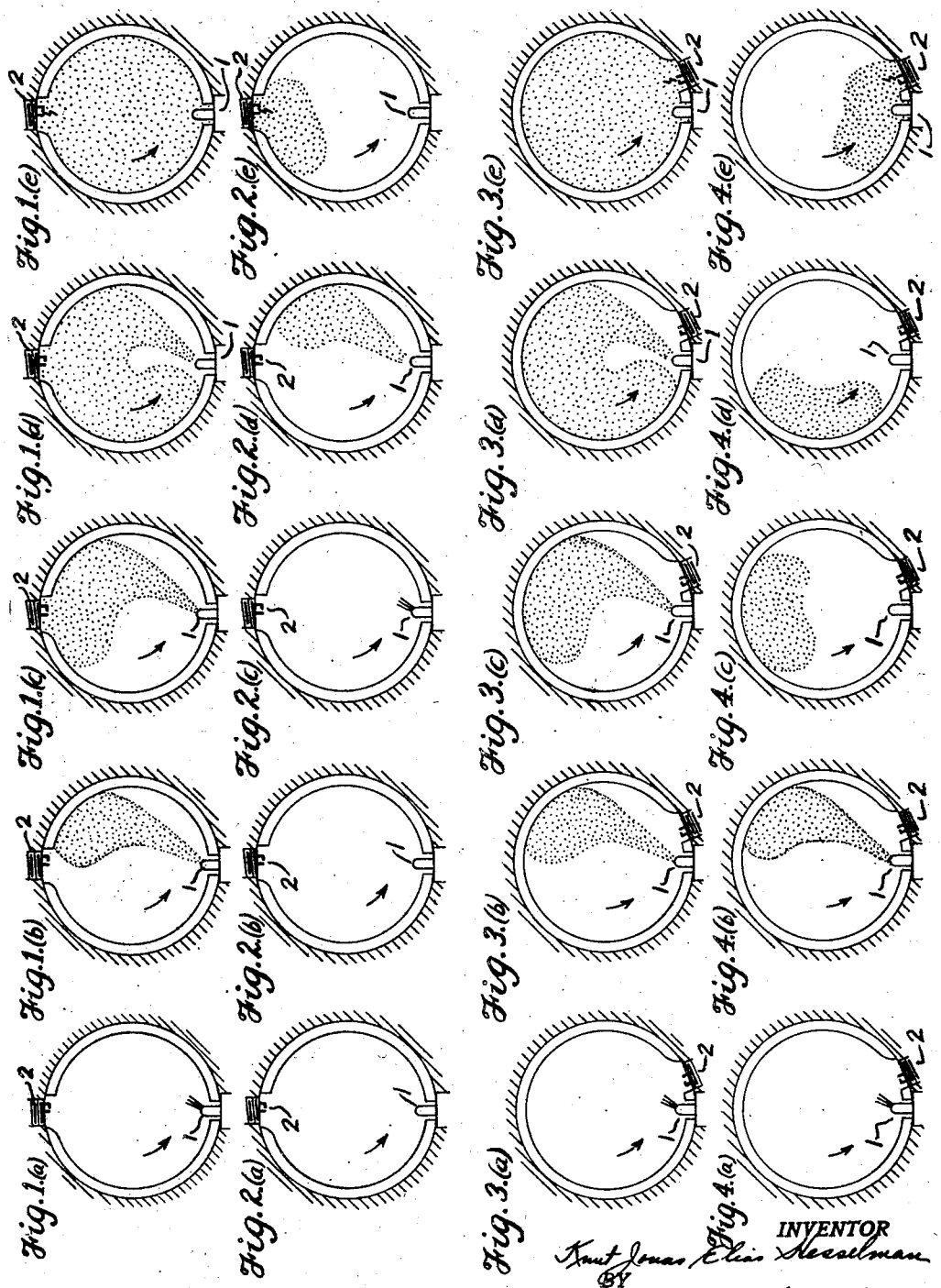

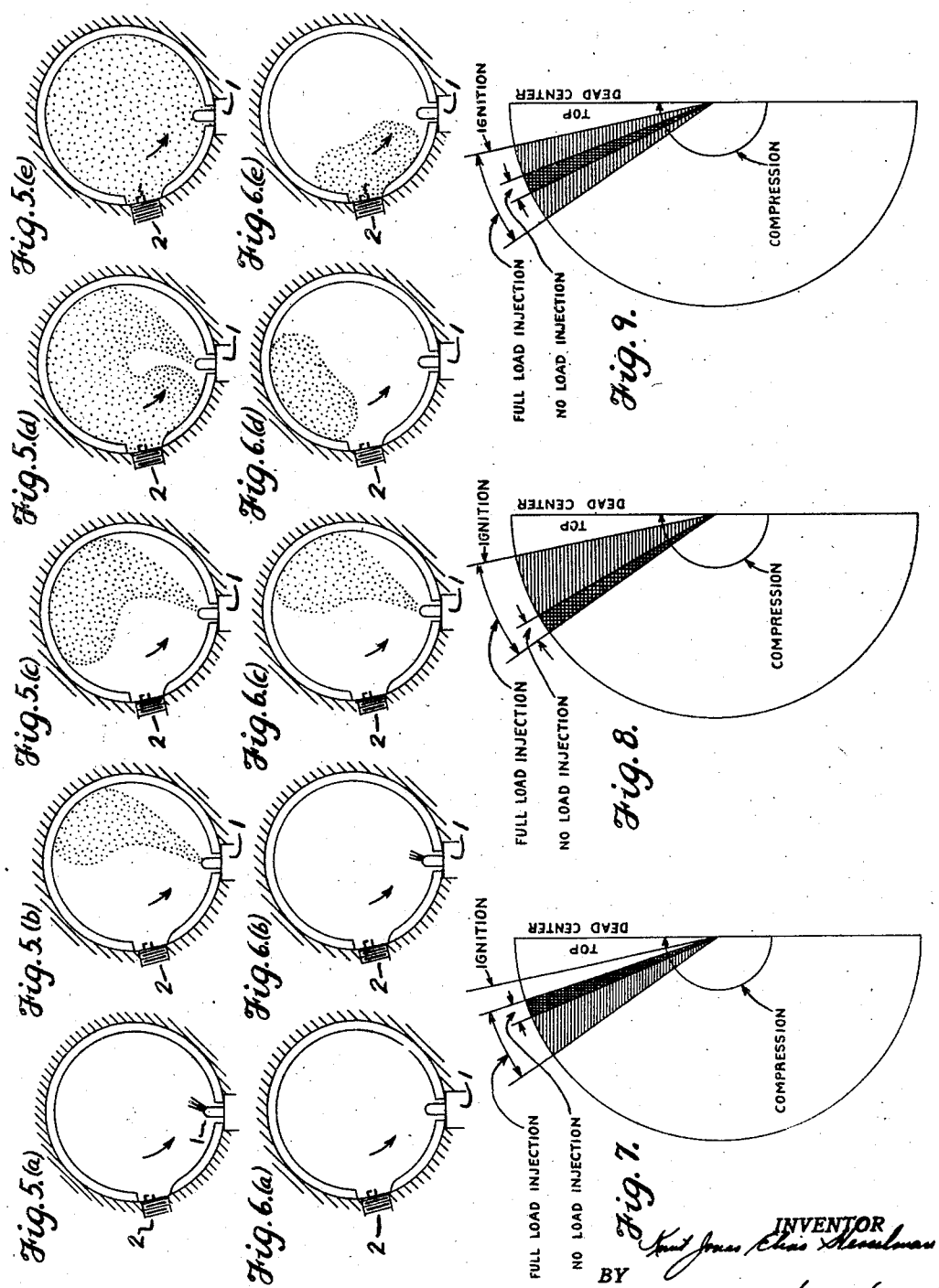

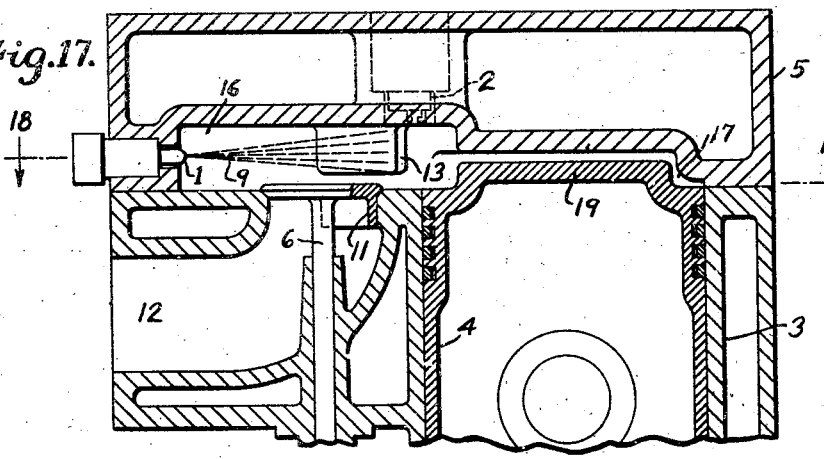
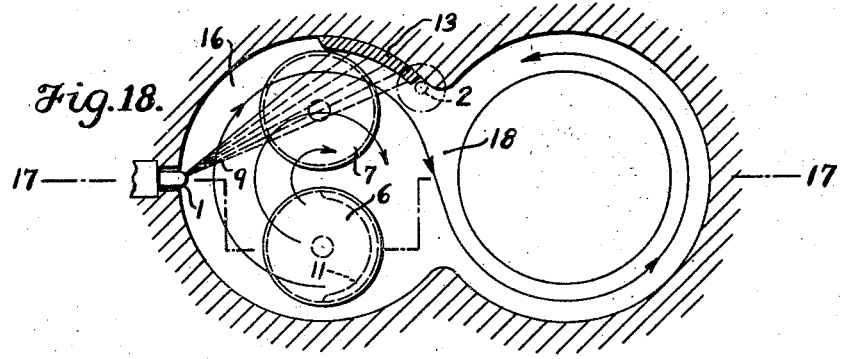
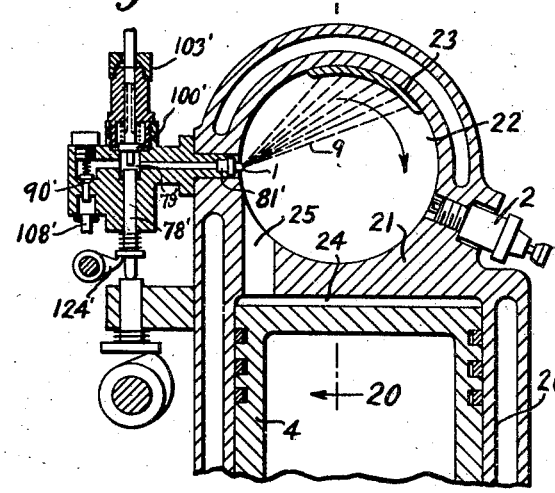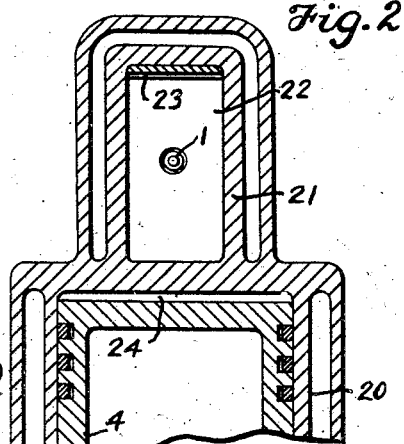

Dec. 8, 1931.  K. J. E. HESSELMAN  1,835,490
INTERNAL COMBUSTION ENGINE
Filed Aug. 6, 1930   10 Sheets-Sheet 5
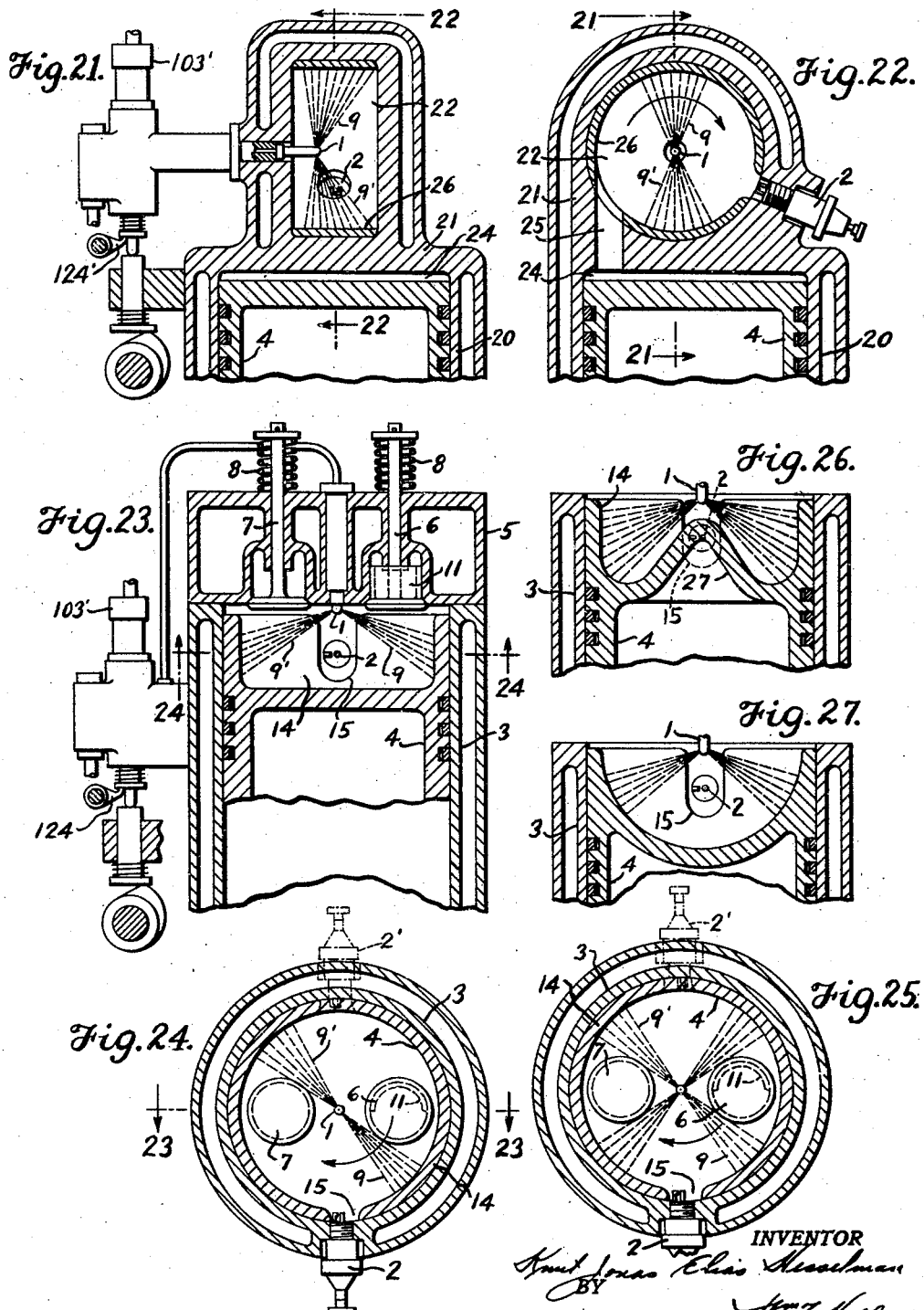

Dec. 8, 1931.  K. J. E. HESSELMAN  1,835,490
INTERNAL COMBUSTION ENGINE
Filed Aug. 6, 1930  10 Sheets-Sheet 7

Dec. 8, 1931. K. J. E. HESSELMAN 1,835,490
INTERNAL COMBUSTION ENGINE
Filed Aug. 6, 1930  10 Sheets-Sheet 8
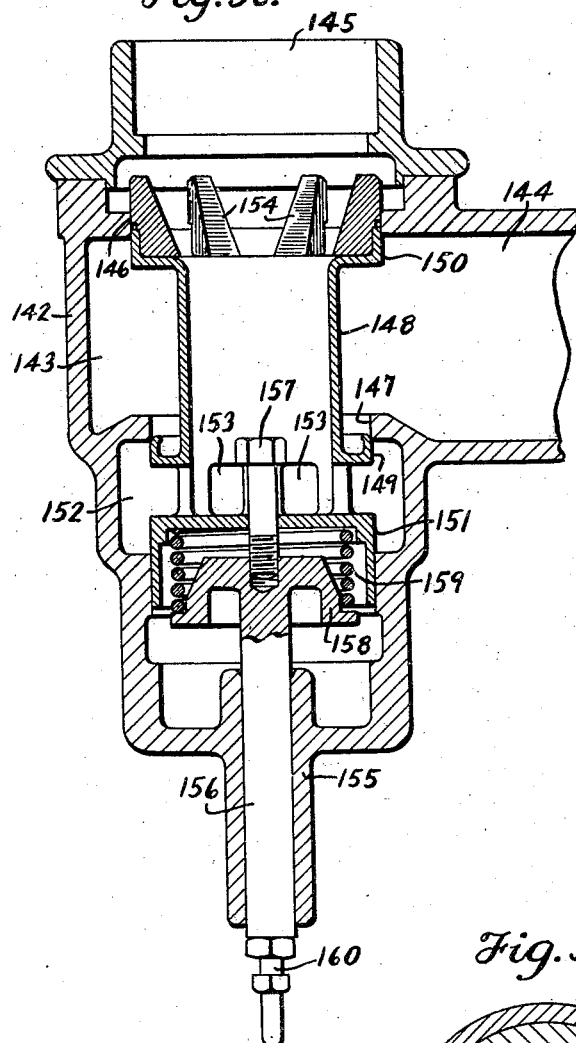
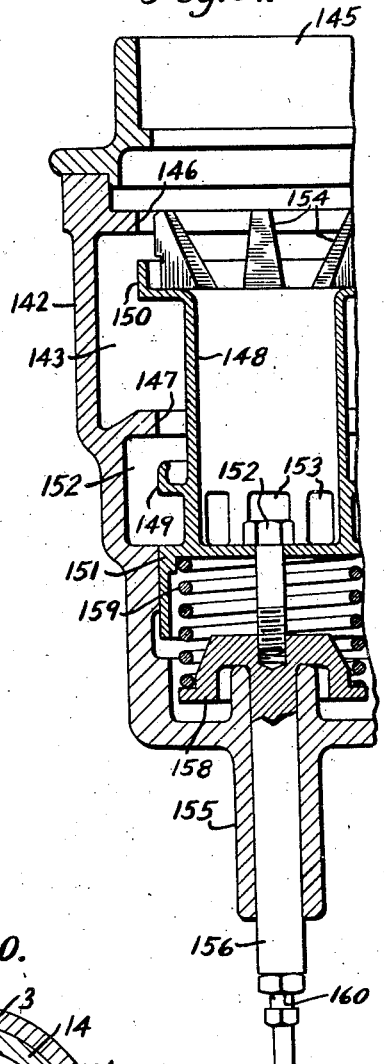
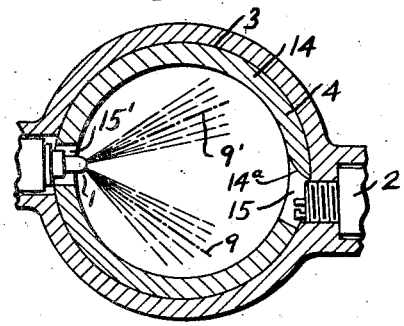

Dec. 8, 1931.   K. J. E. HESSELMAN   1,835,490
INTERNAL COMBUSTION ENGINE
Filed Aug. 6, 1930   10 Sheets-Sheet 9

INVENTOR
Knut Jonas Elias Hesselman
BY
ATTORNEY

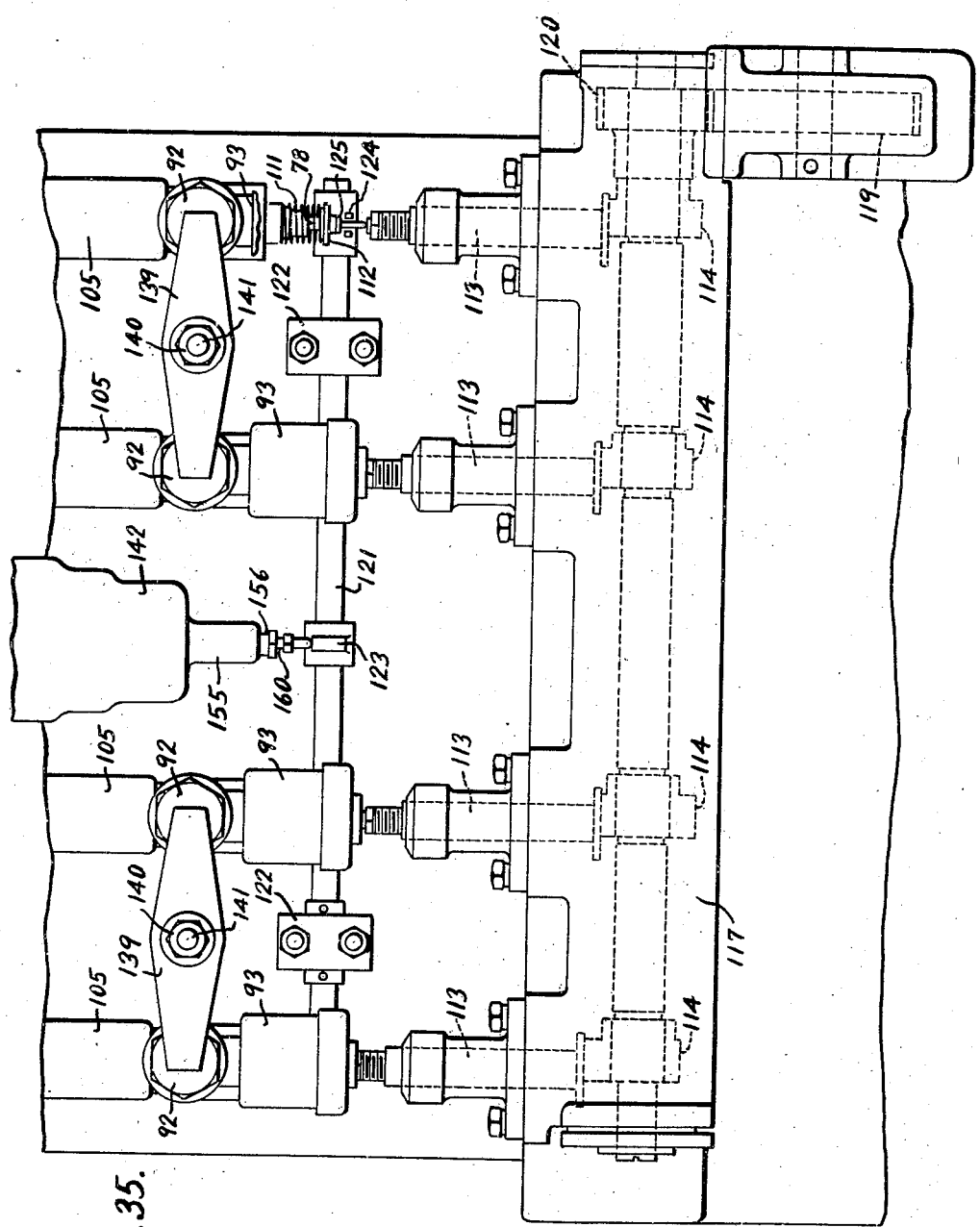

Patented Dec. 8, 1931.

1,835,490

UNITED STATES PATENT OFFICE

KNUT JONAS ELIAS HESSELMAN, OF SALTSJO-STORANGEN, SWEDEN

INTERNAL COMBUSTION ENGINE

Application filed August 6, 1930, Serial No. 473,332, and in Sweden December 31, 1926.

This application is filed to replace in part my copending application Serial Number 240,555, filed December 16, 1927, for which application a corresponding application was filed in Sweden December 31, 1926, Serial Number 4384/26. It further shows and describes subject matter disclosed and claimed in other copending applications hereinafter enumerated and relates back thereto and to the application which it replaces, with respect to common subject matter, for all rights incident to the filing of said applications in the United States and the filing of corresponding applications in foreign countries.

The present invention relates to internal combustion engines. More particularly it relates to low compression engines employing timed ignition. By the term "low compression engines" I mean engines in which the compression ratio is below that which will produce self-ignition in the operation of the engine, due either to the heat of compression alone, as is the action in the case of the full Diesel type, or to the influence of a hot bulb, or to other igniting surface which is maintained at igniting temperature because of the heat generated by combustion during normal engine operation. By the term "timed ignition" I mean ignition due to a source of energy which is under such control that ignition of the fuel charge may be effected in predetermined timed relation to the engine cycle, so that an exactness in the timing of the ignition may be obtained which is not possible with the hot bulb or equivalent type of ignition in which firing of the charge is effected by contact of the compressed fuel charge with a surface which is maintained at a relatively high temperature over a substantial portion of the engine cycle.

Expressed in another way, my invention relates primarily to engines of the explosion type having the general compression and ignition characteristics of the usual form of engine adapted to be operated on gasoline or an equivalent highly volatile fuel and in which the combustible charge is substantially fully formed before ignition and then exploded due to timed ignition occurring at one or more local points in the combustion chamber.

It has long been an object of engine designers to produce an engine having the compression and ignition characteristics of the gasoline engine which can be operated on relatively heavy and non-volatile fuels, which fuels are not only cheaper than the more volatile fuels, but which also are not subject to the extreme fire hazard of gasoline which makes the latter fuel particularly dangerous for use in aircraft engines.

The attempts heretofore made, however, have not produced practical results due chiefly to the difficulties encountered in obtaining dependable and regular ignition of heavy fuels in low compression engines, particularly under conditions of relatively light load in engines the load on which varies.

In connection with prior developments it has been proposed to inject heavy fuel in a finely divided or atomized state into a rotating body of combustion air during the early part of the compression thereof, or even before the beginning of the engine stroke effecting compression. This practice has resulted in obtaining a fairly uniform fuel mixture within the combustion chamber, but it is subject to several disadvantages which prevent its practical use. For example, injection of atomized heavy fuel during the early stages of the compression stroke permits the fuel to reach the relatively cold cylinder wall before the charge is ignited and the fuel striking the walls adheres thereto, mixing with the lubricating oil on the cylinder wall and being lost for combustion purposes. Furthermore, the relatively small quantity of fuel injected for operation under light engine loads results in the formation of a charge so lean in fuel that the mixture cannot be dependably ignited.

The primary object of the present invention is to provide a novel method of forming a combustible charge of fuel in a low compression engine and igniting such charge by means of a timed ignition system in a manner which will enable relatively heavy and non-volatile fuels to be successfully utilized in such engines even when they are operated under widely varying conditions of both speed and load. A further object of the invention is to provide a method of the above character which will result in obtaining the most efficient combustion and the highest mean effective pressure with a given fuel. It is also a major object of the invention to provide novel apparatus whereby the above stated method may be carried into effect.

The invention has as further objects the provision of a novel method of charge forming and ignition which will secure a maximum mean effective pressure in the cylinder during the working stroke, the provision of an improved combustion chamber arrangement for carrying the stated method into effect, and the provision, in combination with the means for carrying the stated method into effect, of improved means for regulating the combustion air supplied to the engine.

The nature of the invention and still further objects thereof are more fully disclosed in the following description, which is to be considered in conjunction with the accompanying drawings forming part of this specification.

In the drawings,

Fig. 1 illustrates diagrammatically one variation of the method of charge formation in accordance with the invention, under full load operating conditions;

Fig. 2 is similar to Fig. 1, illustrating the same variation under light load or no-load operating conditions;

Figs. 3 and 4 are similar to Figs. 1 and 2, and illustrate a second variation of the method of charge formation under full load and no-load operating conditions, respectively;

Figs. 5 and 6 are similar to Figs. 1 and 2, and illustrate a third variation of the method of charge formation under full load and no-load operating conditions, respectively;

Figs. 7, 8 and 9 are diagrams illustrating, respectively, the relative timing of ignition, no-load injection, and full load injection in the variations of the method shown in Figs. 1 to 6;

Figs. 17 and 18 are views similar to Figs. 10 and 11, showing another type of four-cycle engine adapted to be operated in accordance with the invention;

Figs. 19 and 20 are fragmentary vertical sections taken at right angles to each other and illustrating diagrammatically a two-cycle engine adapted to be operated in accordance with the invention;

Figs. 21 and 22 are views similar to Figs. 19 and 20, showing a modified form of two-cycle engine;

Fig. 23 shows a form of large four-cycle engine adapted to be operated in accordance with the method of the invention;

Fig. 24 is a section taken on line 24—24 of Fig. 23;

Fig. 25 is similar to Fig. 24, showing a modified arrangement;

Figs. 26 and 27 are fragmentary views showing modifications of the arrangement illustrated in Fig. 23;

Fig. 30 is a section taken on the line 30—30 of Fig. 29;

Fig. 35 is a side elevation of part of the engine shown in Fig. 29;

Fig. 36 is a vertical section, on an enlarged scale, of the air valve shown in Fig. 29; and Fig. 37 is a view similar to Fig. 36 showing the valve in another position.

Figure 10:
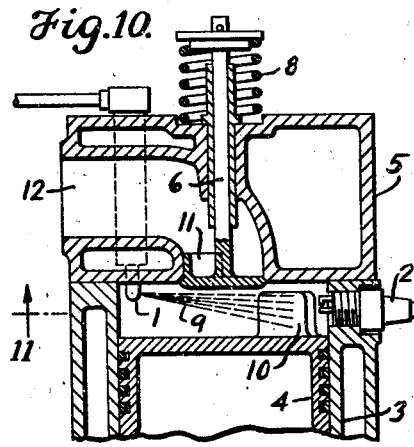
Fig. 10 is a fragmentary diagrammatic illustration of one form of four-cycle engine adapted to be operated in accordance with the variation of the method shown in Figs. 1 and 2.

In order to attain the objects of my invention I employ a type of engine in which air is admitted to the combustion chamber is given a regular movement, as distinguished from turbulent movement, during the compression period. In the more common types of engines this movement of the air during the compression period is most easily effected by causing the air to rotate in a chamber formed as a body of revolution, which is most advantageously cylindrical. During the latter portion of the compression period a metered quantity of fuel is injected into the combustion chamber in such a manner as to traverse the path of movement of the air. The fuel so injected is preferably forced into the combustion chamber in a finely divided or atomized state from an injection nozzle which effects atomization due to the pressure at which the fuel is supplied to the nozzle. While in some instances the fuel may be mixed with a certain quantity of air at the time of injection I prefer to employ the so-called airless or solid injection type of fuel supply system. By directing the injected fuel along a path traversing the path of movement of the air, which fuel path preferably intersects the path of air movement at a pronounced angle, successive volumetric increments of the air within the combustion chamber are impregnated with fuel due to their movement through the injected fuel, and the volumetric percentage of the air so impregnated will be a function of the speed of air movement through the injected fuel and the length of time of the fuel injection period. I have selected the term "increments" for purposes of explanation, it being understood that there are no distinct separate volumes or parts of fluid in the combustion chamber. However, for analysis of the invention we may arbitrarily divide the air into suppositious portions or increments and may thus say that such increments, due to the movement of the air, pass successively into the zone of fuel injection so that the volumetric percentage of the air impregnated by fuel is increased by the progressive addition thereto of successive increments of air passing into the zone of injection.

For example, let it be assumed that in an air charge rotating about the axis of a cylindrical combustion chamber, fuel is injected radially through a single jet placed at the axis of rotation of the moving air. If the speed of the air is so related to the period of injection that the air rotates once during the injection period it will be evident that each increment of air in the chamber will pass through the jet once during the injection period, and that the entire air charge will be impregnated with fuel. Assuming further that the fuel is injected at a uniform rate it will be seen that a charge of substantially uniform fuel density will be formed. Such a charge obviously represents that which is formed for full load operation of the engine.

If the fuel is injected at a rate proportional to engine speed, and the rate of air rotation is also proportional to engine speed, it will be evident that variation in engine speed alone will not alter the manner in which the charge is formed.

Now let it be assumed that under the conditions above stated the load on the engine drops from full load to a lower value and that the period of fuel injection (which it has been assumed is at a uniform rate) is shortened in accordance with the drop in the engine load. Assuming constant engine speed (which would be the natural result of decreasing the fuel supply in accordance with decreasing engine load), the length of time required for the air to make one rotation within the combustion chamber remains constant. It therefore follows that because of the shortened period of fuel injection a part only of the air in the combustion chamber passes through the fuel jet during the injection period, to be impregnated with fuel. This will result in the formation of a charge in the combustion chamber consisting of a localized part of the air therein substantially uniformly impregnated with fuel and comprising a mixture of fuel and air of relatively high fuel concentration with respect to the remainder of the contents of the combustion chamber. Further, the volumetric percentage of the air content of the cylinder represented by the localized part of the air which is impregnated with fuel, will be substantially proportional to the load on the engine. As the load on the engine progressively decreases toward a condition of idling load, which condition I will hereinafter term no-load operation, it will be apparent that the part of the charge which is impregnated to form a combustible mixture will form a decreasingly smaller volumetric percentage of the entire charge.

By forming the charge in the above described manner under varying load conditions, the formation of a very lean mixture at any time is avoided, since the small amount of fuel injected into the combustion chamber under no-load conditions is concentrated in a relatively small percentage of the air within the chamber and in a proportion forming a combustible mixture in the fuel-impregnated part of the charge.

After the injection of the fuel into the moving air has taken place the tendency of the fuel is to diffuse throughout the whole of the charge. However, if the injection of the fuel is confined to the latter part of the compression period, which period is immediately prior to ignition, it will be seen that the time interval between injection and ignition is too short for material diffusion to take place, and the charge can therefore be dependably ignited by firing the part thereof which is impregnated with fuel to a degree rendering combustion certain.

In its broad aspect my invention contemplates the formation and ignition of a fuel charge along the general lines above set forth, by relating the speed of air movement, the time and extent of the fuel injection period, and the time of ignition, so that under full load operating conditions a substantially uniform charge is formed and under conditions of less than full load operation a charge having a localized combustible part is formed and ignited before the fuel-air ratio of said part can be materially altered by diffusion of the fuel from said part into the remaining part of the charge. Stated in another way it may be said that my invention contemplates the formation and ignition of a fuel charge under conditions of part load on the engine by forming within the combustion chamber a localized mixture of fuel and air of relatively high fuel concentration with respect to the remainder of the contents of the combustion chamber and causing movement of said localized mixture of relatively high fuel concentration to the vicinity of a point of local ignition at the time ignition occurs. It will be evident that this localized mixture of fuel and air constitutes only a portion of the charge as a whole, the latter comprising the entire contents of the combustion chamber at the termination of injection. This localized mixture can therefore be considered as a predetermined portion of the charge which is, in accordance with my invention, in the vicinity of the point of ignition at the time ignition occurs. Manifestly the particular portion of the charge which under full load operating conditions is in the vicinity of the ignition point when ignition occurs, is not a critical factor, since under such operating conditions the combustion chamber is substantially entirely filled with a relatively uniform mixture of fuel and air. Accordingly I use the term "predetermined portion" to designate that portion of the whole charge which is of relatively high fuel concentration as compared with the remaining contents of the combustion chamber and it will be evident that this portion does not represent a fixed proportion of the entire charge but a proportion which will vary in predetermined relation with variations in the amount of fuel supplied per working stroke of the engine. It is, however, evident that the method according to my invention will be effected if any part of such predetermined portion is in the vicinity of the ignition point at the time of ignition.

A second and very important consideration in the formation and igniting of charges formed with heavy fuel is the provision of dependable ignition means. In carrying out the method contemplated by my invention I have found that the ordinary form of electrical ignition system employing a spark plug is the most satisfactory form of apparatus to use. This, however, involves the introduction into the combustion chamber of suitable electrodes between which the ignition spark is formed. In order to secure dependability of ignition these electrodes must be maintained in a relatively dry state, and if they are positioned in such manner as to permit the injected fuel to strike them, the low volatility of the fuel will cause larger particles thereof to adhere to and wet the electrodes. Since oil is highly non-conductive of electricity, the coating of the electrodes with an oil film might interefere with or prevent the formation of a proper igniting spark. Furthermore, it is very important that the spark plug body and the insulation between the central and the outer electrodes be kept dry and that the injected fuel does not directly or indirectly strike these parts so as to cool them.

In order to avoid wetting of the ignition device and also in order to avoid loss of fuel due to its striking the relatively cool surface of the engine cylinder, I provide some form of shield forming an impact surface toward which the fuel is directed upon injection, this surface being arranged in such a position that the moving air sweeps across the same. Since the impact surface is passed by the air, I will hereinafter refer to the edge of the shield and of the impact surface formed thereby which is first met by the moving air as the leading edge, and the edge of the shield and of the impact surface last contacted by the moving air as the trailing edge thereof. I have found by experience that the most satisfactory position for the igniting device is adjacent to the trailing edge of the impact surface and in a position closely behind a tangent to the surface at the trailing edge. When the igniting device is in this position the fuel charged air sweeps transversely across and just in front of the electrodes, in case a spark plug is used, there being sufficient diffusion to form a combustible mixture contacting the electrodes, but the transversely moving air serves to carry the heavy particles of fuel past the electrodes in a manner to prevent their being wetted by the charge.

The means herein disclosed for shielding the igniting device is particularly useful when employed in conjunction with the method of and means for charge forming and igniting constituting the subject matter of the invention claimed herein but it also may be advantageously employed in engines in which the charge is formed and ignited in other ways. This means forms the claimed subject matter of my copending application Serial No. 571,874 filed October 29, 1931.

The method of charge formation and ignition in accordance with my invention is applicable to many different specific forms of engines and is also susceptible to wide variations in the method itself. In the foregoing outline of the broad method, I have, for purposes of clarity, assumed fuel injection to be radial from the axis of rotation of the moving air and by means of a single jet. This specific arrangement of the fuel injection means is suitable for some types of engines but, as will hereinafter appear, is not the best arrangement to use with other types.

In order to understand the variations in the method of charge formation which may be employed, regardless of the specific type or form of engines used, reference may best be had to the diagrams shown in Figs. 1 to 6, in which three specifically different variations in the method of charge formation are illustrated in connection with an engine having a cylindrical combustion chamber, which may, for illustrative purposes, be assumed to be formed by the upper part of the engine cylinder directly above the piston, and which furthermore may be assumed to be in an engine having a relatively small cylinder diameter. In the assumed form of engine a usual location of the valves for the introduction of air and the exhausting of spent combustion gases is in the cylinder head, directly over the piston. This valve arrangement interferes, except in the case of engines having cylinders of large diameter, with the placing of an injection nozzle at the axis of rotation, and in each of the diagrams I have shown the fuel nozzle placed near the periphery of the combustion chamber and discharging a fuel jet transversely of the path of movement of the moving air charge, the path of fuel injection being substantially that of a chord across the circular path of movement of the air.

For purposes of explanation it will be assumed that the air has been admitted to the combustion chamber by means causing it to rotate at a speed proportional to engine speed irrespective of engine load. It is also assumed that the fuel is supplied to the injection nozzle by means causing the fuel to issue from the nozzle at a rate proportional to engine speed, the varying fuel requirements for variations in load being taken care of by varying the length of the period of fuel injection. It will further be assumed that injection is effected during the latter part of the compression period.

Referring now to Fig. 1, the diagrams (a) to (e) illustrate the conditions in the engine cylinder during the portion of the engine cycle embracing the fuel injection and ignition periods, with the engine operating under full load conditions in accordance with one variation of the charge forming method.

Fig. 1(a) shows the beginning of injection which, for purposes of illustration only, will be assumed to be 40 degrees ahead of top dead center on the compression stroke of the engine.

Figs. 1(b), 1(c) and 1(d) illustrate the progressive formation of the charge between the assumed 40 degrees advance and an assumed 15 degrees advance, and Fig. 1(e) illustrates the condition of the charge at the time of ignition, which may be assumed to be about 10 degrees in advance of top dead center.

In Fig. 2 the several views illustrate the charge formation under idling or no-load conditions, the different diagrams representing the same times in the engine cycle as do the corresponding diagrams in Fig. 1. By comparing Figs. 1 and 2, it will be seen that under no-load operating conditions, in accordance with the variation illustrated, the commencement of fuel injection is delayed as compared with the commencement of fuel injection under full load conditions, and the termination of fuel injection is held constant. In other words, under full load conditions injection occurs during a longer period of the engine cycle than under no-load conditions, but under both conditions, and under intermediate load conditions as well, injection terminates at substantially the same fixed time in the engine cycle.

Figs. 1 and 2 show the extreme conditions of full load and no-load, but from these diagrams the reader will readily imagine the nature of the charge formation at intermediate loads, with commencement of injection occurring later than in Fig. 1 and earlier than in Fig. 2, and terminating at the same time as that shown in both figures.

When this variation of the method is employed, the timing of the termination of the injection period with respect to the timing of the ignition is such that the fuel last injected is given just sufficient time to be carried, by injection and by air rotation, from the vicinity of the fuel injection nozzle 1 to the vicinity of the ignition device 2 at the instant when ignition occurs.

In accordance with the above variation, the fuel last injected may be said to represent no-load injection, and the timing of this injection bears a fixed relation to the engine cycle.

In Figs. 3 and 4, diagrams similar to the diagrams shown in Figs. 1 and 2 are used to illustrate a second variation in the method of operation in which the fuel first injected, instead of the fuel last injected, represents no-load injection and is timed to bear a fixed relation to the engine cycle. It will be seen from the diagrams forming Fig. 3 that full load injection is timed in a manner similar to the full load injection illustrated in Fig. 1. The no-load injection shown in Fig. 4 is, however, opposite from the no-load injection shown in Fig. 2, in that injection starts at the same time that full load injection starts, but terminates much sooner. In this variation, the ignition device 2 must be placed in a different position with respect to the injection nozzle 1, other factors such as speed of air rotation, etc. being constant. This is necessary because if the fuel first injected, which represents no-load injection, is to be in the vicinity of the ignition device under all conditions of load, it must travel a complete revolution before ignition occurs in order to permit the cylinder to be filled with fuel under full load operating conditions before explosion takes place.

Turning now to Figs. 5 and 6, the diagrams therein illustrate a third variation in the method of operation which is, in effect, a compromise between the two variations above described. In this variation of the method, full load injection is essentially the same as in the two preceding variations, but no-load injection is secured by delaying the commencement of the injection period with respect to the engine cycle and advancing the termination of the injection period with respect to the engine cycle, so that the fuel injection corresponding to no-load conditions on the engine, the timing of which injection must be substantially fixed with respect to the engine cycle, is at an intermediate point in the full load injection period.

As will be seen from the diagrams, the fuel corresponding to no load, which is injected at a fixed point in the engine cycle, travels along a longer path before reaching the igniting device than in the variation shown in Fig. 2, and along a shorter path before reaching the igniting device than when injected in accordance with the variation shown in Fig. 4.

By comparing the several sets of diagrams it will be seen that the three variations, while specifically different, all utilize the same fundamental method, which consists in forming a fuel charge in such manner that at light engine loads the injected fuel is not diffused throughout the combustion chamber before ignition, and so timing and relating the period of fuel injection, the speed of air movement in the combustion chamber and the ignition that the fuel corresponding to no-load operating conditions is always in the vicinity of the ignition device at the time ignition occurs. In order to accomplish this basic method of operation, the time of no-load injection should be at a substantially fixed point in the engine cycle, and it will be evident that the no-load injection, occurring at a relatively fixed time, can be at any selected time within the time range of the period of full load fuel injection.

In Figs. 7, 8 and 9, representative timing of full load and no-load injections and of ignition are diagrammatically illustrated in another manner, Fig. 7 illustrating the variation shown in Figs. 1 and 2, Fig. 8 illustrating the variation shown in Figs. 3 and 4, and Fig. 9 illustrating the variation shown in Figs. 5 and 6.

In each of these representative timing diagrams, ignition has been shown as occurring at a single defined point of time in the engine cycle, but it is to be understood that the time of ignition, regardless of the variation of the method of fuel injection employed, may be varied through a range of time in the engine cycle, depending upon variations in design and other factors affecting individual engines. The ignition times shown in these diagrams may be considered as representing typical timing occurring between limits of retardation and advance of the ignition, which limits may define a range of ignition time from closely adjacent top dead center to a time in the engine cycle ahead of the latest time at which injection may occur.

It will be noted that in Fig. 7, ignition is timed to occur after injection is completed. By reference to Figs. 1 and 2 it will be seen that when no-load injection is represented by the fuel last injected, this timing is easily possible, since all of the fuel injected for greater loads is injected at an earlier point in the cycle than is the no-load fuel.

On the other hand, in the variation of the method shown in Figs. 3 and 4, full load injection occurs at a time in the engine cycle between the beginning of no-load injection and ignition, and if a complete full load charge is to be introduced without having the no-load fuel carried past the ignition point by the rotating air, injection under full load conditions must continue up to about the time of ignition. It is for this reason that in Fig. 8 ignition and the termination of full load injection are shown as being timed concurrently. In operating motors in accordance with the variation shown in Fig. 8, I have found that, in order to secure the maximum possible cylinder charge, injection may, in some instances, have to be continued for a short period after ignition occurs. For this and other reasons, I prefer to use the variation of the method shown in Figs. 1, 2 and 7, as will now be explained.

It is one of the objects of this invention to secure the maximum possible mean effective pressure in the cylinder and I have found that the most effective combustion, resulting in the highest pressures, takes place when the charge is completely formed and the total fuel in the charge evenly distributed in the part of the air which is to be fuel-charged, at or before the time when the explosion due to ignition takes place.

If explosion takes place before all of the fuel is injected, the local pressure caused by explosion effects a compression of the remaining free air which so reduces its volume that the fuel still to be injected is not able to mix with a proper quantity of air, and less efficient, or incomplete, combustion results. Furthermore, injection of fuel after combustion has been initiated can result in a chilling effect preventing the most efficient combustion.

There is always a certain time lag between the time of ignition, that is, the time at which the spark occurs, and the actual explosion, which produces the rapid rise in pressure within the cylinder. The amount of this time lag varies depending upon the load, speed, heat conditions, compression ratio of the engine, kind of fuel used and other factors which should be kept in mind when considering the proper actual timing of the ignition for different loads and speeds. The existence of this time lag is well known, as is also the fact that the degree of the time lag varies with variations in numerous factors including those above stated. This variation in the time lag is not peculiar to the method of charge formation comprising the present invention but is more or less common to all forms of internal combustion engines of the explosion type and the manner in which this time lag is to be taken into consideration when determining the exact timing to be employed in engines embodying the present invention will be readily apparent to those skilled in the art.

It will thus be seen that while completion of injection before explosion takes place is not essential to the carrying out of the basic invention, it is much to be preferred, and I accordingly consider the variation of the method shown in Figs. 1, 2 and 7 as the best, since this variation permits completion of the charge before explosion, under all conditions.

Figure 11:
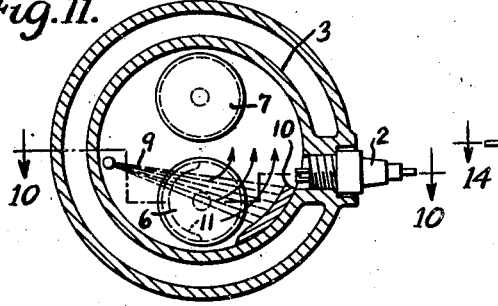
Fig. 11 is a section taken on the line 11—11 of Fig. 10.

Considering now, in diagrammatic form, the different physical embodiments of apparatus capable of carrying the several variations of the method into effect, Figs. 10 and 11 illustrate diagrammatically the cylinder of a valve-in-the-head motor arranged to form a combustion charge in accordance with the preferred variation of the method illustrated in Figs. 1 and 2.

Referring now to the figures, 3 indicates the usual water-jacketed cylinder in which is located the piston 4. The upper end of cylinder 3 is closed by the usual water-jacketed cylinder head 5 in which are seated the inlet valve 6 and exhaust valve 7. These valves are closed by springs 8 and are opened by the ordinary form of cam actuated rocker arms (not shown).

The injection nozzle 1 in this form passes through the cylinder head and projects into the combustion chamber adjacent to the periphery thereof. It is drilled to project a single jet across a chord of the cylinder, as indicated by dotted lines 9 in Fig. 11. The piston 4 is provided with an upstanding segmental flange 10 located peripherally just in advance (with respect to the direction of air flow) of the electrodes of the ignition spark-plug 2 and in a position such that the jet from the nozzle 1 is directed toward the inner surface of the flange, which will hereinafter be referred to as an impact surface. The details of the relative arrangement of flange and igniting device will be referred to more in detail later.

The inlet valve 6 is provided with a semicircular skirt 11, this skirt operating when the inlet valve is opened during the suction stroke of the piston to cause the air admitted through the inlet passage 12 to rotate as it enters the cylinder. The speed of rotation of the air admitted through a valve of this form varies in proportion to variations in engine speed and does not vary with variations in load on the engine.

Figure 12:
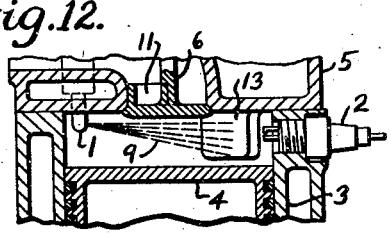
Figs. 12 and 13 are fragmentary sections showing modifications of the structure illustrated in Fig. 10.

Fig. 12 illustrates a modification of the construction shown in Figs. 10 and 11, the only difference being that the flange 13 forming the impact surface toward which the fuel jet is directed is made as a part of the cylinder head rather than as a part of the piston 4.

Figure 13:
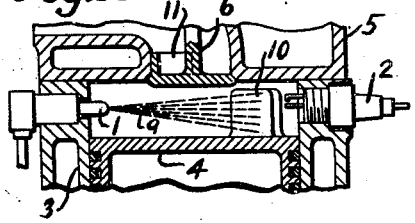

Fig. 13 is still another variation of the form shown in Fig. 10, the only difference being the use of an injection nozzle 1 passing through the side of the cylinder rather than through the cylinder head.

Figure 14:
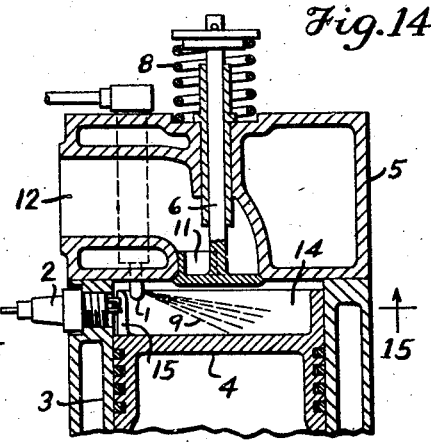
Fig. 14 is a view similar to Fig. 10, illustrating the same general form of four-cycle engine, adapted to be operated in accordance with the variation of the method shown in Figs. 3 and 4.
Figure 15:
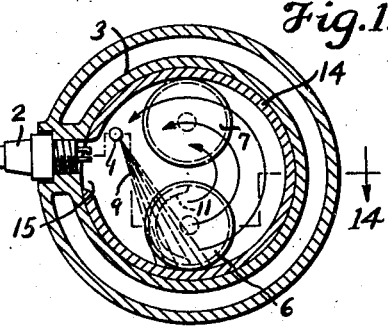
Fig. 15 is a section taken on the line 15—15 of Fig. 14.

Figs. 14 and 15 illustrate an engine of the same general type as that shown in Fig. 10, but adapted to carry out the specific variation of charge formation illustrated in Figs. 3 and 4. In the form shown in Fig. 14 the injection nozzle 1 extends through the cylinder head and the flange 14 on the piston 4 extends around the full periphery of the piston except for a slot 15 providing communication between the combustion chamber and the electrodes of the ignition plug 2.

Comparison of Fig. 15 with Fig. 3 will serve to illustrate the similar location of the injection nozzle with respect to the ignition device in the two figures.

Figure 16:
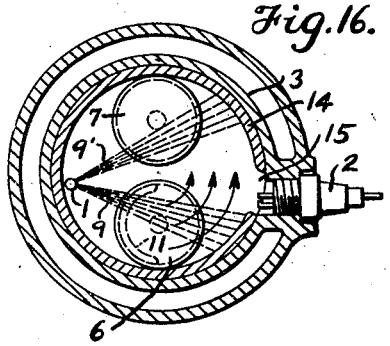
Fig. 16 is a view similar to Fig. 11, showing a further modified arrangement.

Fig. 16 illustrates a form of construction adapted to operate in accordance with the preferred variation shown in Figs. 1 and 2, but in this form the injection nozzle 1 is arranged to project two separated fuel jets, indicated at 9 and 9', into the rotating air in the combustion chamber.

When fuel is injected into the chamber in two separated jets, the general method of charge formation and ignition is carried out without alteration from the method described in connection with the single jet nozzles shown in the illustrative diagrams.

For purposes of comparison, the jet 9 may be considered as being timed identically the same as the jets shown in the diagrams, the only difference being that the jet 9 does not introduce the entire fuel charge under any condition of load, but only a part thereof. Under light load and no-load conditions, instead of having but one segregated portion of the combustion chamber filled with fuel-impregnated air, as shown, for example, in Fig. 2, the light load fuel charge is divided into two smaller segregated portions of fuel-charged air. In the form illustrated, timing of the ignition with respect to the movement of one of these portions is carried out as if the one portion were the only fuel-charged part of the combustion air, and the second portion of fuel-charged air is ignited by flame propagation from the first portion, which is ignited by the plug. If desired, where the fuel is subdivided into separated portions, each portion may be independently ignited by using a plurality of properly placed and timed plugs.

The reason for using more than one jet of fuel is to enable a relatively low rate of air rotation to be employed with a relatively short period of injection. Both of these are desirable desiderata.

By reference to Fig. 1, for example, it will be seen that in the formation of a fuel load charge, a full revolution of the air during the injection period is required. If the injection period is to be kept within a relatively short period, the air, if it is to move through a full revolution during the injection period, must rotate at relatively high speed. In order to effect a high speed of rotation of the air, the proportioning of the inlet valve and its skirt must be such that considerable resistance to air flow through the valve is introduced, and this tends to decrease the volumetric efficiency of the engine at high speeds. For this reason it is desirable to reduce the rate of air rotation to as low a value as possible. By using two jets, the speed of air rotation necessary can be materially decreased as compared with that required when only a single jet is employed, since under all load operating conditions less than a full revolution of the air is required to impregnate the entire contents of the combustion chamber with fuel.

A low speed of air rotation can be used with a single jet if the period of injection is lengthened, but the method employing a plurality of jets and a short injection period is to be preferred. The reason for this is that it is highly important that the fuel injected does not impinge against the cylinder wall, and when a long period of injection is used, the piston is a considerable distance from the top of its stroke at the commencement of the injection period. At the commencement of the injection period it is necessary for some form of shield to be in front of the jet, and a shield on the piston, high enough to be opposite a jet at the commencement of an injection occurring relatively early in the compression stroke, would be highly objectionable.

Likewise, a shield of the form shown in Fig. 12, which would take care of a long injection period, since the position of the shield is fixed with respect to the injection nozzle, is a less preferable form of shield than a shield on the piston because of the fact that in practical operation liquid fuel may collect on the shield and pass therefrom to the cylinder wall, either directly or by way of drip onto the piston head. By reference to Fig. 14 it will be evident that from this standpoint the flange 14, extending substantially completely around the piston, is to be preferred.

Furthermore, it will be seen from Fig. 14 that if injection is confined to the latter portion of the compression stroke, in an engine provided with a substantially fully flanged piston, the fuel may be injected under all conditions of load into a chamber effectively separated from the relatively cold cylinder wall.

Another consideration rendering the short injection period preferable is that it permits injection to be confined to the latter part of the compression stroke when the piston is near the top of its stroke. This enables injection to be effected in a chamber having a relatively short longitudinal dimension, which in turn renders relatively easy the uniform distribution of fuel longitudinally of the chamber by means of one or more jets arranged adjacent to the upper end of the cylinder. If injection occurs early in the compression stroke there is possible an undesirable longitudinal stratification of the fuel due to the injection thereof across the upper end of a relatively long chamber.

Still another consideration in favor of the short injection period is that it permits the use of relatively large nozzle orifices which are less likely to clog than are the extremely fine orifices necessary in case fuel injection is prolonged over a relatively long period.

Figs. 17 and 18 illustrate diagrammatically the cylinder of a typical L-head engine arranged to form and burn a charge of fuel in accordance with the preferred variation of the method as shown in Figs. 1 and 2. In this form the cylinder 3 and head 5 form a cylindrical combustion chamber 16 offset from the clearance space 17 at the top of the cylinder and connected therewith through the wide port 18. The fuel injection nozzle 1 is situated adjacent to the periphery of combustion chamber 16, and the location of this nozzle with respect to the location of the shield 13 and plug 2 is similar to that shown in Fig. 13.

The head of piston 4 is provided with a central, circular projection 19, which when the piston reaches the top of its stroke, causes an annular clearance space to be formed around the periphery of the piston head.

When piston 4 descends on the suction stroke, the formation of chambers 16 and 17 and the initial motion given to the entering air by means of the skirt 11 on valve 6 cause the combustion air to move as indicated by the arrows in Fig. 18, which movement is continued during the ensuing compression stroke. The effect is to give a rotary movement to the air in the combustion chamber which permits any of the specific variations of the method of charge formation previously described in connection with Figs. 1 to 16 to be carried into effect. The specific combustion chamber arrangement illustrated in Figs. 17 and 18 forms the claimed subject matter in my copending application Serial No. 240,554 filed December 16, 1927.

Figs. 19 and 20 illustrate a form of construction suitable for carrying the invention into effect in a two-cycle engine. Referring to Fig. 19, the cylinder 20 is shown as having an integral head 21 forming a water-jacketed combustion chamber 22 shaped as a body of revolution, preferably cylindrical, through the periphery of which project the injection nozzle 1 and the ignition plug 2. Within the chamber 22 shield 23 may be employed to prevent projection of fuel against the relatively cold water-cooled surface forming the wall of the combustion chamber. Combustion chamber 22 is connected with the upper portion of the bore 24 of cylinder 20 by means of the port 25 which directs air tangentially into the combustion chamber 22 as the piston 4 rises on the compression stroke, thus giving the necessary rotary movement to the air within the combustion chamber.

The relation of the positions of the injection nozzle 1, shield 23 and plug 2 is shown in this figure as adapted to carry out the variation of the method shown in Fig. 1.

Figs. 21 and 22 show a modified form of construction adapted to be utilized in a two-cycle engine, employing in the combustion chamber 22 a centrally located fuel injection nozzle 1 delivering two jets 9 and 9′ and also employing a substantially full peripheral shield 26 lining the combustion chamber.

Figs. 23 and 24 illustrate a form of construction suitable for use with valve-in-the-head four-cycle engines similar to the type illustrated in Fig. 10, but having relatively large cylinder bores. In this construction the diameter of the cylinder head 5 and the spacing of valves 6 and 7 is such that a centrally located injection nozzle 1 may be employed. In the form shown, the centrally located injection nozzle is used in conjunction with a piston 4 having a substantially full peripheral flange 14 of the type shown in Fig. 14. Further, in the specific form illustrated the injection nozzle supplies two jets 9 and 9′ which form separated fuel impregnated portions in the combustion chamber which may be ignited either through a single plug 2 or by twin plugs firing simultaneously. The location of a second plug 2′ for the use of twin ignition is indicated by dotted lines in Fig. 24.

Fig. 25 illustrates a form of construction similar to that shown in Figs. 23 and 24 in which four jets instead of two are employed. This arrangement is particularly well adapted for use in engines having cylinders with very large bores. As in the use of any of the multiple jet arrangements, ignition may be effected by one or more properly timed igniting devices. In the figure, a second plug 2′ is indicated for use when twin ignition is desired.

Figs. 26 and 27 illustrate modified forms of piston head contours which may be employed in engines of this type. The form shown in Fig. 26 provides an annular form of combustion chamber when the piston 4 is at the top of its stroke, the piston being formed with a central conical projection 27 and an upstanding peripheral flange 14 to keep the fuel jets from impinging upon the cylinder walls.

Fig. 27 illustrates a piston 4 having a hemispherical head which forms a thermally efficient type of combustion chamber and also provides surface against which radially directed fuel jets may impinge.

In the forms shown in Figs. 23 to 27 a desirably uniform fuel distribution is more easily obtainable than in motors where injection is effected from a point adjacent to the periphery of the cylinder, but with small motors, practical structural limitations render the central location of the injection nozzle difficult to secure. From the preceding description of the basic method of the invention it will be seen that an arrangement such as is shown in Fig. 26 enables particularly effective charge formation to be accomplished.

From the foregoing diagrammatic illustrations it will be evident that the basic method contemplated by the invention is capable of being carried out in various specific ways, and it will further be evident that the method is applicable to many different forms and types of engines.

It will further be evident from the foregoing that parts of the structure shown in some of the illustrated forms may be incorporated in other forms without departing from the scope of the invention. For example, instead of using a single jet and a segmental shield in the L-head construction shown in Fig. 17, a double jet nozzle may be used in conjunction with a shield protecting substantially the entire wall surface of combustion chamber 16. Likewise, the fuel nozzle may be inserted into the combustion chamber either through the cylinder wall or through the head in the various different forms illustrated.

Figure 28:
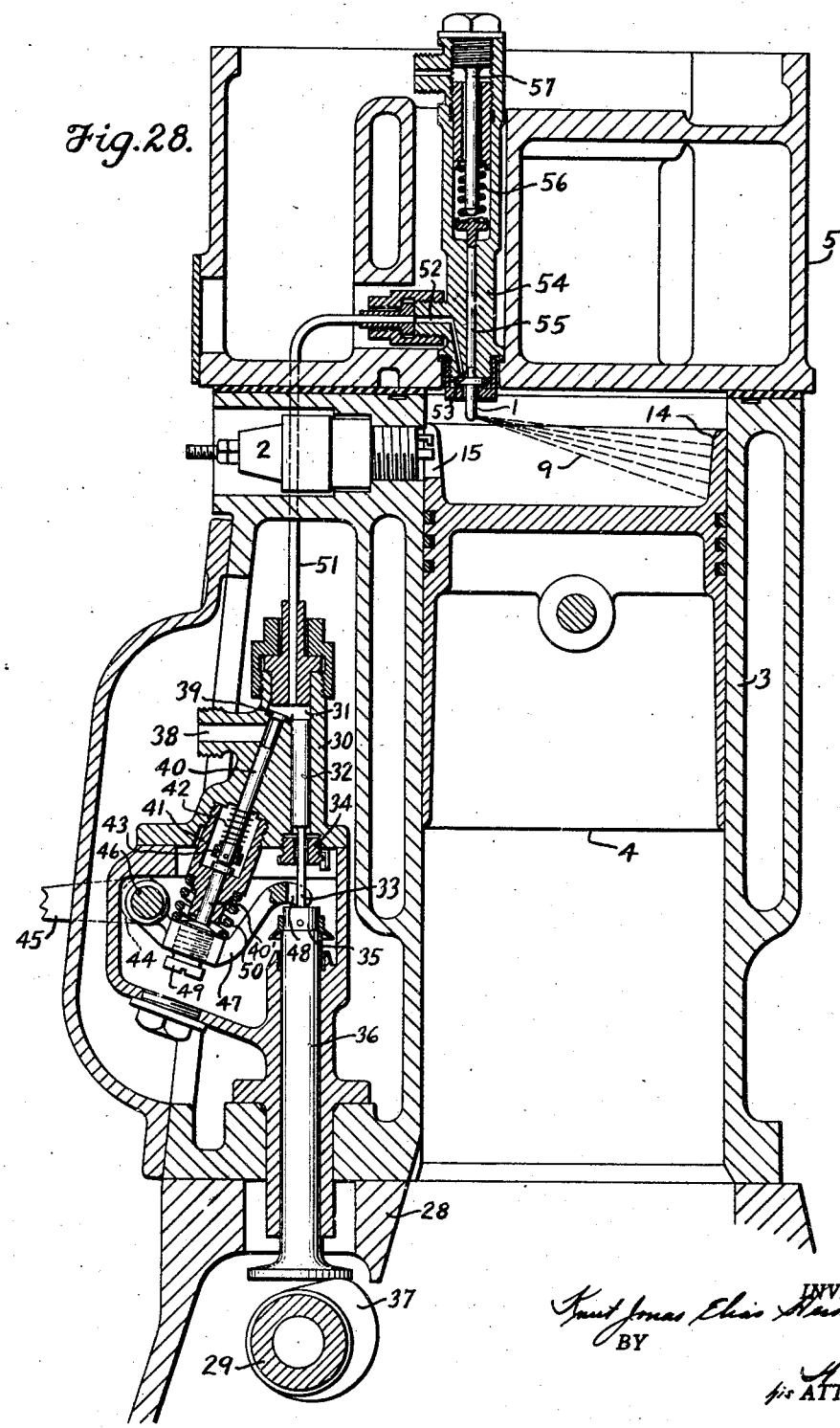
Fig. 28 is a vertical section through part of an engine illustrating a cylinder and fuel injecting mechanism adapted to operate in accordance with the variation of the method shown in Figs. 3 and 4.

Turning now to Fig. 28, there is illustrated a practical form of engine adapted to operate in accordance with the variation of the charge forming method shown in Figs. 3, 4 and 8 and including the fuel injecting system employed. The engine, which is of the valve-in-the-head type, comprises a cylinder 3 and detachable head 5 carrying valves in the manner shown in Figs. 10 and 11. Air rotation is established by means of a valve similar to the skirted valve 6 such as is shown in Fig. 10.

Within the crank case 28 of the engine there is located the usual cam shaft 29 for operating the engine valves, this cam shaft being geared to rotate at one-half engine speed in the ordinary known manner.

Each cylinder has mounted adjacent thereto a fuel pump comprising a body 30 providing a pump chamber 31 and a bore in which is located plunger 32, the latter having an extension 33 extending through a nut 34 adapted to fix the lower end of the stroke of plunger 32 the plunger to fix the moment of beginning of the injection. The plunger is actuated by a tappet 36 actuated by cam 37 on shaft 29, said tappet acting on the head 35 at the lower end of extension 33.

Oil is admitted to the pump chamber 31 through passage 38, which is controlled by the suction valve 39. Valve 39 comprises a head seating in the pump body and a stem 40 extending through a suitable bore in the pump body to the exterior thereof. The lower end of stem 40 is surrounded by a sleeve 41 screwed into the pump body, and the valve is closed by a spring 42 situated between the pump body and a suitable collar 43 on the valve stem 40. A rock shaft 44, to which is attached control lever 45, has formed thereon an eccentric 46 forming a bearing for one end of an actuating arm 47, the outer end of which is bifurcated at 48 and rests on head 35. An adjusting nut 49, screwed into arm 47, abuts against the lower end of a valve tappet 40' adapted to lift stem 40, and arm 47 is urged towards depressed position by spring 50 acting between the arm and a shoulder on sleeve 41.

The pump chamber 31 is connected by means of pipe 51 to a bore communicating with a recess 53 at the bottom of the injection valve body 54 which carries the injection nozzle 1.

The bore within nozzle 1 is normally closed by the lower end of a shouldered plunger 55 which is held in position by means of the spring 56 and which is prevented from rising beyond a predetermined position by means of the adjustable stem 57.

The fuel injecting mechanism just described is substantially the same in its method of operation as the ordinary form of injection pump and valve used on Diesel engines, and provides for constant commencement of injection and variable termination thereof, such as is required in order to carry out the variation of the method of operation illustrated in Figs. 3 and 4. Assuming that the pump plunger 32 is at the top of its stroke, the inlet valve 39 will be lifted from its seat because of the lifting of arm 47 by tappet 36. As the tappet 36 moves downwardly upon rotation of cam 37, the plunger 32 will be pulled downwardly on its suction stroke by arm 47 acting under the influence of spring 50, and the chamber 31 will be filled with oil due to suction which lifts valve 39. When the plunger 32 has reached the end of its suction stroke, valve 39 will be closed due to the lowering of arm 47, and consequently delivery through pipe 51 will take place as soon as plunger 32 starts to rise. The rise of plunger 32 is governed by cam 37, the position of which does not vary with respect to the engine cycle, so that delivery from the pump always starts at the same point in the engine cycle. The timing, with respect to the engine cycle, of the commencement of delivery of fuel from the pump is determined by the position of the nut 34 which fixes the lower end of the stroke of the plunger 32 and consequently fixes the lowermost position of the extension 33, which is contacted by tappet 36, as the tappet rises, to initiate the delivery stroke of the plunger. As soon as the upward movement of plunger 32 has built up sufficient pressure in the discharge line to lift the plunger 55, due to pressure in the recess 53, injection starts.

Injection continues during the upward stroke of plunger 32, and the rate of injection is proportional to the rate of speed of the engine, since the rate of speed of the plunger 32 is proportional to engine speed. Injection continues so long as valve 39 remains closed. This valve will eventually be opened by the lifting of arm 47 as the tappet 36 rises, and injection will obviously cease when the valve opens, since the opening of the valve releases the pressure in pipe 51, permitting the plunger 55 to shut off flow to the injection nozzle due to the action of spring 56 and permitting excess fuel to flow from the pump chamber back into the supply connection 38.

Variable cut-off of the injection is secured by rotation of the eccentric 46 on shaft 44, through movement of the control lever 45. By turning shaft 44, the left-hand end (as seen in Fig. 28) of the arm 47 may be lowered or lifted, as desired. If it is lowered, the termination of injection will be delayed, since this will make necessary the lifting of the right-hand end of arm 47 by tappet 36 to a relatively higher position before valve 39 will be opened. Conversely, turning movement of shaft 44 to lift the left-hand end of the arm 47 will advance the time of termination of fuel injection, since with the left-hand end of arm 47 in a relatively higher position, valve 39 will be opened with the tappet 36 in a relatively lower position, which position the tappet reaches at an earlier period in the engine cycle. The nut 49 affords means for initially setting the mechanism to cause opening of valve 39 during the desired time range in the engine cycle.

In the form of mechanism just described, efficient atomization is secured throughout the whole time of injection, since the plunger 55 does not lift until adequate atomizing pressure has been built up and flow of fuel to the nozzle is abruptly stopped by this plunger when valve 39 is opened.

However, the injection valve formed by plunger 55 is difficult to keep in proper adjustment over long periods of service, and I have found a simpler form of fuel injecting mechanism, which will be described in connection with the ensuing figures, to be more satisfactory in operation.

Turning now to Figs. 29 to 37, I have illustrated therein a form of engine which I have found to be highly satisfactory from a practical operating standpoint and which has been built and successfully operated both under dynamometer test conditions and as the motive power for a motor truck.

Figure 29:
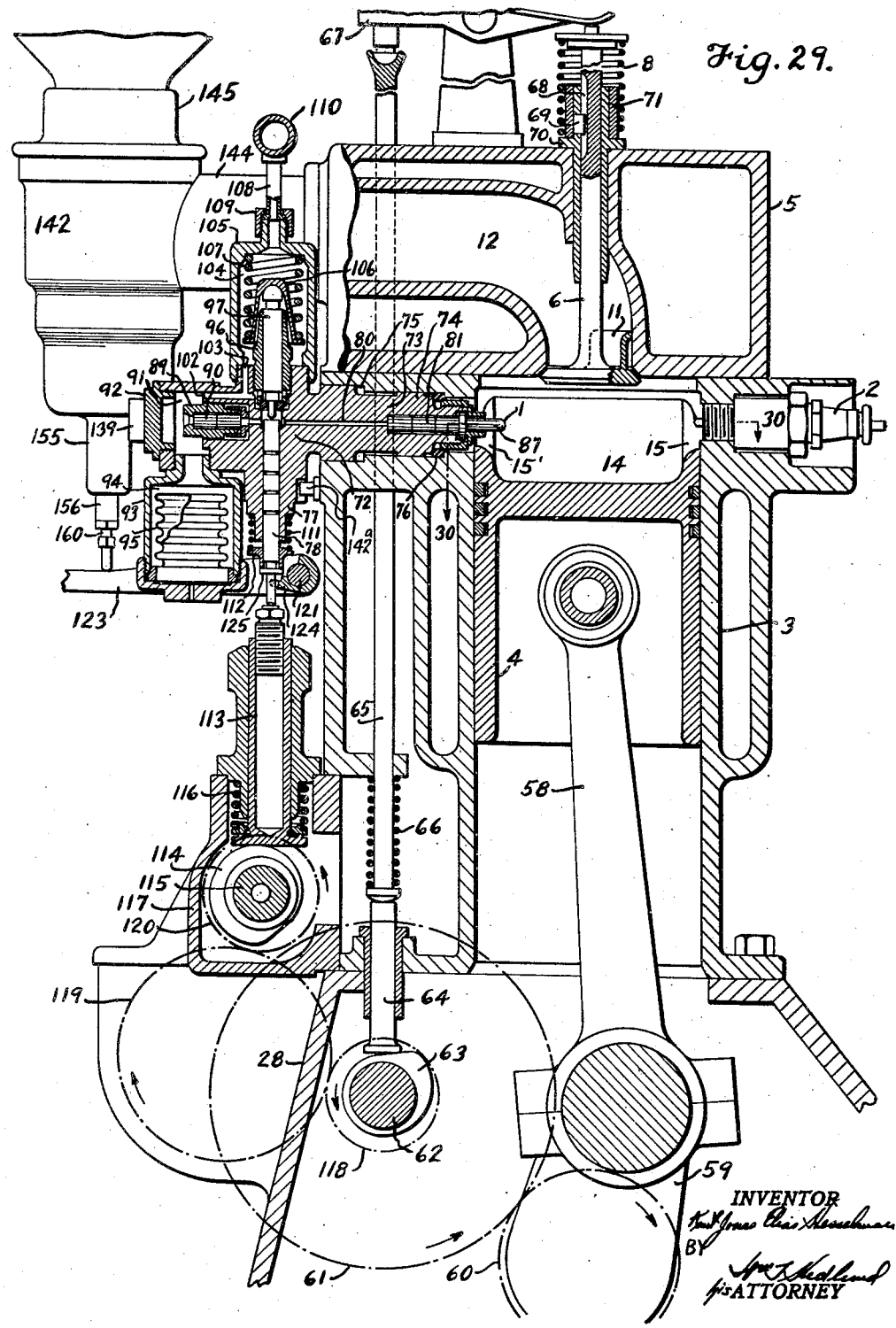
Fig. 29 is a section similar to Fig. 28, illustrating a preferred form of engine which I have built and operated in accordance with the variation of the method shown in Figs. 1 and 2.
Figure 31:
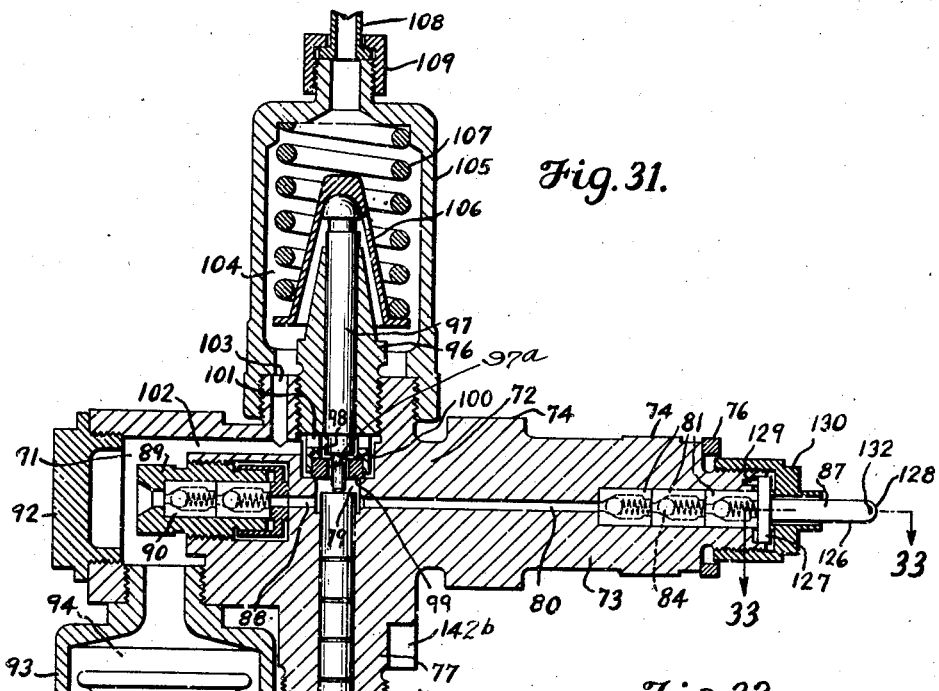
Fig. 31 is a section on an enlarged scale of the fuel pump shown in Fig. 29.
Figure 32:
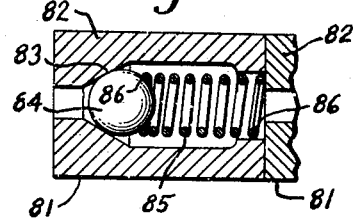
Fig. 32 is an enlarged detail of the check valves shown in Fig. 31.

Referring more particularly to Fig. 29, the engine illustrated comprises the cylinder 3 and detachable head 5, the latter carrying the skirted inlet valve 6 for admitting air to the cylinder from the inlet passage 12. Piston 4, mounted in cylinder 3, is provided on its head with the peripheral upstanding flange 14 which is slotted at 15 for the plug 2 and at 15' for the injection nozzle 1. Piston 4 is connected by means of connecting rod 58 with the crank shaft 59, the latter carrying the usual cam shaft drive gear diagrammatically indicated at 60. Gear 60 meshes with the gear indicated at 61, which is carried by the cam shaft 62. Shaft 62 carries the usual valve lifting cams 63 operating tappets 64. Tappets 64 serve to lift the usual valve push rods 65 against the action of springs 66. Rods 65 operate the usual rocker arms 67 to actuate the cylinder valves. I have shown the valve actuating mechanism for only the inlet valve 6, such mechanism being duplicated for the exhaust valve and the valves of other cylinders in the case of multi-cylinder engines. The inlet valve 6 has been shown partly in section to illustrate the manner in which this valve is prevented from rotating, so that the skirt 11 will remain in the correct position to cause rotation of the combustion air in the desired manner. The means for preventing rotation of the stem comprises a vertical slot 68 milled in the inlet valve stem, which slot receives a key 69 passing through the fixed valve stem bushing 70. Key 69 is retained in position by means of the sleeve 71 inside the coil valve spring 8.

The fuel injection system employed in this form of engine comprises a pump and injection nozzle of extremely simple form and construction, which are illustrated on an enlarged scale in Figs. 31 to 34.

Referring now to these figures, the pump comprises a main body 72 having a laterally extending arm 73 provided with spaced cylindrical guide surfaces 74 adapted to fit into the bore 75, (Fig. 29) in the cylinder block 3. The arm 73 is shouldered, as is the bore 75 and a seal between the pump body and the cylinder is secured by forcing the pump inwardly against the packing gasket 76 which is preferably of relatively soft material, such as copper. A downwardly extending arm 77 is drilled to form a cylinder for the pump plunger 78 and the upper end of the plunger bore is counter-bored to form a pump chamber 79. Arm 73 is drilled to form a discharge passage 80 leading from the pump chamber 79, the outer end of this passage being counter-bored to receive the discharge check valve assemblies 81, shown in detail in Fig. 32. Each of these discharge check valve assemblies comprises a small cylindrical sleeve 82 having a differential bore therethrough forming a valve seat 83, preferably conical, against which the ball check valve 84 is pressed by means of spring 85. The end coils of spring 85 are preferably turned or ground to form conical or spherical seats 86 exactly centered about the axis of the spring, and the spring is guided at its baes by contact with the walls of the bore through the sleeve 82. From Fig. 32 it will be seen that this arrangement provides for accurate centering of the ball check valves 84 and also permits the maximum freedom of action of spring 85, which, while held in guided position, is free from frictional contact with sleeve 82 through the major portion of its length. The springs 85 in the first two check valve assemblies 81 are held in position by abutting against the ends of adjacent sleeves 82 and the spring in the last assembly is held in position by abutting against the base of the injection nozzle, which will be described later. The above described pump valve construction forms the claimed subject matter of my copending applications, Serial Nos. 439,602 and 439,603 filed March 28, 1930.

The pump body 72 is also drilled to form an inlet passage 88 in communication with pump chamber 79, passages 80 and 88 preferably being in alignment. Passage 88 is counter-bored and threaded to receive a sleeve 89, which is in turn counter-bored to receive two inlet check valve assemblies 90. The construction and arrangement of these assemblies is essentially the same as that of the discharge valve assemblies.

Sleeve 89 opens into chamber 91 which is formed by a counter-bore in the pump body and which is closed by means of the removable plug 92. Chamber 91 is in communication with a closed cylinder 93 screwed into the pump body and forming a chamber 94 in which is located an elastic diaphragm 95. The one illustrated is of bellows form, although other types of resilient diaphragms may be employed.

The plunger bore in the pump body is continued therethrough above the pump chamber 79 and at its upper end has threaded therein a sleeve 96, in which is located plunger 97. The lower end of plunger 97 is of reduced diameter, forming a pin 97a adapted to contact the upper end of the pump plunger 78 when the latter approaches the upper end of its stroke. Sleeve 96 carries at its lower end a counter-bored extension 98 which seats against a ring 99. Pin 98 passes through this ring, and the shoulder on plunger 97 forms, with ring 99, a valve 100. The extension 98 is bored at 101 and this bore communicates with bores 102 and 103 in the pump body. Bores 102 and 103 form a passage connecting the chamber 91 with chamber 104, the latter chamber being formed by the cap 105 screwed on the pump body and enclosing the sleeve 96.

Seated on the upper end of the plunger 97 is a conical spring retainer 106 and between this retainer and the upper end of cap 105 is the spring 107, which acts to close valve 100.

The upper end of cap 105 is connected to the fuel supply pipe 108 through a suitable screwed connection 109. The pipes 108 for each pump are preferably connected to a common main supply line 110 (Fig. 29) to which fuel is supplied either by gravity or by a fuel supply pump.

The pump plunger 78 is urged downwardly by means of the pump spring 111, the latter being retained between a suitable retainer 112 on the pump plunger and the lower end of the extension 77 of the pump body.

Turning again to Fig. 29 it will be seen that the lower end of the pump plunger 78 is adapted to be contacted by the tappet 113 which is in turn actuated by the cam 114 formed on the cam shaft 115. Tappet 113 is held in contact with the cam face by means of spring 116.

In the form of construction illustrated, which shows a motor of conventional type, converted for use with the present invention, the pump cam shaft 115 is carried in a small auxiliary housing 117 (see also Fig. 35) secured to the side of the cylinder block and is driven from the main cam shaft 62 by means of the gear train comprising gears indicated at 118, 119 and 120. It will be seen from Figure 29 that the cam shafts 62 and 115 rotate in the same direction and at the same speed, and it will be quite obvious that a single cam shaft may be employed to operate both the valve actuating tappets 64 and the pump actuating tappets 113.

Adjacent to the lower end of the pump plungers a control shaft 121 is mounted on the side of the cylinder block 3 by means of brackets 122 (Fig. 35). This shaft has mounted thereon a control lever 123 and for each pump, there is provided a bifurcated arm 124 engaging the lower face of collar 125 adjacent to the lower end of the pump plunger.

In Fig. 29 the engine and pump assembly is shown at the beginnig of the suction stroke of the cycle, with the inlet valve 6 just commencing to open and the pump plunger on its downward or suction stroke. As the pump plunger descends it draws fuel from the chamber 104 through passages 103 and 102 and chamber 91 to the pump chamber 79 by way of the inlet check valves 90. During this period the valve 100 is closed by spring 107. Plunger 78 is forced downwardly on its suction stroke by spring 111, and it will be seen that the length of the suction stroke will be determined by the position of the bifurcated arm 124, which is operated by the control arm 123. By shifting the position of the control lever 123, the length of the suction stroke can be altered. If lever 123 is depressed sufficiently (as shown in Fig. 29) the pump plunger will follow tappet 113 to the bottom of its stroke, thereby drawing a full charge of fuel into the pump. If the control lever 123 is lifted, the downward travel of the pump plunger will be stopped by the arm 124 before the end of the normal full suction stroke is reached, and when the tappet 113 rises on the succeeding stroke the commencement of the upward or discharge stroke of the pump plunger will be correspondingly delayed. This arrangement, it will be seen, provides for varying the time of commencement of the discharge or injection stroke of the pump with respect to the engine cycle.

As the pump plunger approaches the end of its discharge stroke and while the plunger is still moving at a relatively high velocity, the upper end of the plunger strikes the extension 98 of plunger 97 and lifts the latter against the action of spring 107 away from the ring 99 to open valve 100. This action opens the by-pass formed by bore 101 and passages 102 and 103, thereby placing the pump chamber in communication with the chambers 91 and 104. Since the position of the pump plunger, as soon as it is lifted by tappet 113 from the arm 124, is always fixed with respect to the engine cycle, the opening of the by-pass leading from the pump chamber to the suction chambers always occurs at a fixed point in the engine cycle and it will thus be seen that this arrangement provides for the injection of fuel in accordance with the variations of the method of charge formation illustrated in Figs. 1, 2 and 7, that is, by variable commencement of the time of fuel injection and fixed termination of the time of fuel injection.

The excess fuel remaining in the pump chamber at the time the by-pass is opened is driven by the pump plunger into the suction chambers. In order to secure an immediate drop in pressure in the pump chamber so that closing of the pump discharge valves will not be delayed, the elastic diaphragm 95 in chamber 94 is provided. This diaphragm, by compressing, readily provides the additional volume on the suction side of the pump necessary to accommodate the excess oil from the pump chamber. Without such a diaphragm the excess oil could be forced into the pump suction chambers only by displacing some of the oil therein by reverse flow through the suction line and this action would introduce undesirable back-pressure affecting the speed with which the pump discharge valves close.

The above described type of pump is illustrated diagrammatically in Fig. 19, the variations in stroke of plunger 78' being effected by movement of the control arm 124', and the fixed termination of injection being effected by plunger 78' opening the relief valve 100', which permits the excess oil in the pump chamber 79' to flow into the relief channel 103'. Channel 103' may conveniently lead to the pump supply line which in this instance is shown at 108'. The pump inlet check valve is indicated at 90' and the discharge check valve at 81'. Novel features relating to the pump construction and pump mounting structure, hereinabove described, are not claimed herein but form the claimed subject matter of my copending applications Serial Nos. 315,957 filed October 30, 1928 and 538,756 filed May 20, 1931.

Figure 33:
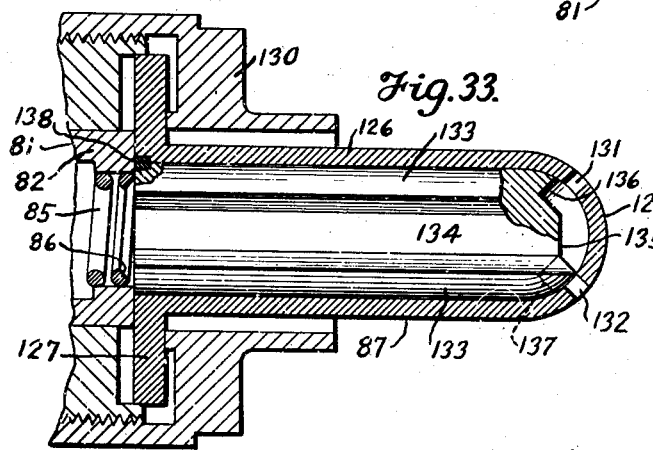
Figs. 33 and 34 are greatly enlarged details of the injection nozzle shown in Fig. 31, several times actual size.
Figure 34:
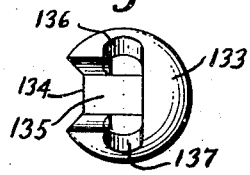

While different forms of injection nozzles may be utilized in conjunction with my invention, I have found that very satisfactory operation may be secured with the type of nozzle illustrated in detail in Figs. 33 and 34. This nozzle comprises an outer cylinder 126 flanged at one end as at 127 and closed at the other end by the hemispherical head 128. The flange 127 carries a pin 129 (Fig. 31) adapted to fit in a suitable recess in the end of the arm of the pump body, and the nozzle is held in position by means of the threaded sleeve 130 which engages the flange. The head 128 is drilled to provide cylindrical orifices 131 and 132. These orifices are adapted to project fuel jets into the combustion chamber in the manner illustrated in Fig. 30. The pin 129 is for the purpose of preventing the nozzle cylinder 126 from turning and throwing the jets out of correct position. The cylinder 126 has located therein a core 133 having a longitudinal channel 134 cut therein, said core having a hemispherical end adapted to fit closely against the interior surface of the hemispherical head 128. The channel 134 extends from the base of the core to the center of the head thereof, as at 135 (Fig. 34) and the end 135 communicates with two cylindrical recesses 136 and 137, which are of larger diameter than the orifices 131 and 132. These recesses are cut so that with the core in position within the cylinder they register concentrically with the orifices 131 and 132, and they are prevented from being displaced by means of the key 138 which prevents turning of the core within the cylinder. The novel features of the form of injection nozzle just described form the claimed subject matter of my copending application Serial No. 415,630 filed December 21, 1929.

The channel 134 is in communication, by way of the discharge check valves 81, with the pump discharge passage 80 and it will be evident from Figs. 33 and 34 that oil forced through this channel will enter the recesses 136 and 137 tangentially and set up a whirling flow therein, so that it is projected from the orifices 131 and 132 in the form of a whirling spray of generally conical form. The strength of the springs holding the discharge valves closed is such that flow through the injection nozzle is commenced only after the oil has been raised to high pressure in the pump chamber. This results in efficient atomization at the commencement of the injection, since the oil first flowing through the nozzle issues therefrom at high pressure, and efficient atomization is maintained to the end of the injection period because of the quick release of pressure due to the opening of the pump by-pass by the plunger 78 and the action of the diaphragm 95 in permitting a sudden drop of pressure in the pump chamber when the by-pass is opened. This arrangement prevents the tendency of the injection nozzle to drip because of flow of oil therethrough at low velocity, either at the beginning or at the end of the injection period. In this connection it is also to be noted that the rapid closing of the pump discharge valves due to the sudden release of pressure in the pump chamber prevents reverse flow through the injection nozzle under the influence of the pressure existing in the combustion chamber after injection ceases. This prevention of reverse flow prevents the entry of hot combustion gases into the nozzle passages and thereby prevents carbonization of the oil therein, which would tend to clog the passages.

Turning again to Fig. 29 it will be seen that the entire pump and nozzle assembly forms a very compact unit in which the length and volume of the discharge passage leading from the pump chamber is reduced to a minimum. This is highly important in the practical operation of an engine of this type, since the quantity of fuel injected per stroke is very small, particularly at low loads, and since the high pressures to which the oil is subjected will cause inaccuracies in the amount metered to the combustion chamber if the discharge line leading from the pump has material volume, due to the compressibility of the oil. It is also to be noted in this connection that because of the compressibility of the oil, even with a short discharge passage such as I employ, the pump plunger may have some motion without causing injection. In other words a condition of no injection at the nozzle does not necessarily mean a condition of no stroke of the pump plunger.

The pump assembly which I have illustrated has, furthermore, other advantages from a practical standpoint, since the pumps, together with their nozzles, form complete and interchangeable units which may be readily removed for inspection, cleaning or repair without in any way interfering with the adjustment of the pumps. This feature is highly important since the adjustments are of necessity relatively fine.

Referring now to Fig. 35 I have illustrated the manner in which the fuel pumps are mounted on the cylinder block. The cylindrical surfaces 74 on arms 73 of the pumps form centering surfaces for holding the pumps in exact position, thereby fixing the proper clearance between the lower end of the pump plunger and the tappets 113, so that the pumps can be removed and replaced without destroying the proper pump adjustment. The pumps are held in position and the seal formed by the gasket 76 is maintained by means of clamps 139 arranged to hold the pumps in pairs by contact against the outer faces of the plugs 92. Clamps 139 are held in position by means of nuts 140 secured on studs 141 extending from the side of the cylinder block. The pumps are held in vertical alignment by means of the pins 142a (Fig. 29) on the cylinder block, which project into suitable recesses 142b (Fig. 31) cut in the pump bodies.

I will now give, by way of practical example, the more important details of construction, with respect to the engine illustrated in Figs. 29 to 35. The engine is a four-cylinder, medium duty type the cylinder dimensions of which are 100 millimeters bore by 136 millimeters stroke. The compression ratio employed is approximately 6 to 1 and the inlet valve, located in the cylinder head, has a free area of approximately 330 square millimeters, measured as free valve diameter by valve lift.

Air rotation, as secured by use of the skirted type of inlet valve, is at a speed that is proportional to engine speed. The use of rotating air, the rotation of which is secured by means of skirted inlet valves, is known in Diesel engine practice, and the manner of proportioning the valve and cylinder dimensions in order to secure a desired speed of air rotation are known. By way of example, one method of determining this factor of the design is through the use of the following empirical formula:

Cylinder diameter $x$ stroke $= k x$ valve diameter $x$ valve lift.

In the above formula, $k$ is a factor varying with the variation in the rate of air rotation and where, for example, a rate of air rotation equal to double the engine speed is desired, the value of the factor $k$ is approximately 40.

As stated above, the preferred variation of the method of charge formation is employed in the particular engine being described, that is, with constant termination of fuel injection under all load conditions and with variable commencement of fuel injection under variable loads.

As shown in Fig. 30, the ignition plug 2 is placed about 170° behind the injection nozzle 1, and the nozzle is offset slightly from the diameter of the cylinder. The center lines of the two jets are indicated by lines 9 and 9′, the center line of jet 9, which may be termed the ignition jet, lying at an angle of approximately 40° with respect to the pump center line and the center line of jet 9′, which may be termed the secondary jet, lying at an angle of approximately 22° with respect to the pump center line. The relative positions of the injection nozzle and the plug, in the engine illustrated, were dictated by physical characteristics of the cylinder block used, and it will be clear that the relative positions of the injection nozzle and the plug can be changed if the angle of the injection jets is accordingly changed. In other words, by slightly changing the angle of the fuel jets, the plug and injection nozzle may be placed diametrically opposite each other as in the diagrams comprising Figs. 1 and 2.

From the above it will be seen that the fuel injection and ignition timing is in accordance with that shown in Fig. 7. In the engines I have built, ignition has been secured from ordinary known forms of automotive magnetos, but it will be apparent that ignition may equally well be effected by battery and coil. The electrical ignition systems I prefer to employ, either magneto or battery, and the manner of their timing, are so well known to those ordinarily skilled in the art that it is not deemed necessary to describe them in detail in this specification.

With the plug and nozzle arrangement illustrated in Fig. 30 I have found that efficient operation is secured with a speed of air rotation equal to approximately double the revolutions per minute of the engine. The initial speed of air rotation through the intake valve is greater than this, but should be about this speed near the end of the compression stroke when injection takes place. With this speed of air rotation and this arrangement of ignition plug and injection jets, I terminate injection at a fixed point substantially 16° ahead of top dead center on the compression stroke. Under normal full load conditions injection should commence at about 32° to 33° ahead of top dead center and under no-load or idling conditions injection should commence at about 22° ahead of top dead center. For maximum load on the engine injection should commence at 40° to 42° ahead of top dead center.

The air speed given may appear to be too slow, in view of the short injection period, to cause the entire air charge to be impregnated at full load, even with the use of dual jets. Full impregnation, however, is secured with the relatively low air speed given, due to the fact that the nozzle used projects conical jets which will impregnate a certain percentage of the air without the aid of air rotation. From a consideration of Fig. 30 it will be apparent that more air movement would be required to effect the impregnation of a given percentage of the air if the jets were in the form of vertical sheets than is required with the form of jets indicated. In other words, with jets having an appreciable horizontal spread, full impregnation can be effected, in case two jets are used, with less than a half revolution of the air during the injection period.

With the arrangement illustrated ignition should take place under normal full load operating conditions at approximately 12° ahead of top dead center, and as will be readily understood by those skilled in the art, the time of ignition should be varied either manually or by means of a governor, in the same manner that the ordinary gasoline engine ignition is varied, in order to secure maximum combustion pressures in the cylinders at the beginning of the working stroke.

At maximum load and speed the ignition was set to take place at 20° and at no-load it was set to take place at 3°–10°.

As previously pointed out, the placing of the ignition plug with respect to the shield formed by the flange on the piston is important from a practical operating standpoint. I have found that in an engine of the size given, a flange of 6 to 7 millimeters thickness is satisfactory from an operating standpoint, and I have found that the electrodes of the plug should be placed closely adjacent to the trailing edge of the impact surface of the flange towards which the ignition jet is directed. In the engines which I have operated, using standard types of automotive ignition plugs, I have found the most suitable position for the electrodes to be approximately 2 millimeters behind a tangent to the impact surface at the trailing edge thereof. This position may, however, be varied. By arranging the plug in the manner described I have been able to employ the usual standard type of ignition plugs without experiencing difficulties due to fouling of the plugs because of fuel deposits on the insulation.

Further, I have found that improved performance of the plugs is secured if the flange forming the shield is beveled as at 14a on the trailing side of the plug, this arrangement preventing the undesirable collection of fuel on the wall of the slot 15 through which the electrodes of plug 2 extend and also reducing the tendency of the slot to produce undesirable eddy currents in the rotating charge. This arrangement is disclosed and claimed in my copending application, Serial No. 571,874, already referred to.

For this engine I have found a pump plunger diameter of 7 millimeter suitable when the pump cam 114 is so shaped as to give the plunger a speed of about 650 millimeters per second when injecting the fuel at an engine speed of a thousand revolutions per minute. The diameter of the nozzle holes 131, 132 is about 0.35 of a millimeter.

While the method of charge formation and combustion embraced by my invention may be employed without regulation of the air supply to the engine cylinders I have found that the thermal efficiency of the engine may be materially increased if the air supply to the cylinders is controlled in accordance with variations in load on the engine within a certain range. If an uncontrolled air supply is used the large amount of excess air present in the combustion chambers at low loads acts to reduce the temperatures attained therein due to combustion and does not permit the securing of maximum efficiency from the engine.

I have found that in the upper power range, from full load down to substantially half load, the most efficient operation can be obtained by admitting a substantially unrestricted supply of air to the cylinders. Below the point of half load, maximum efficiency is obtained only by throttling the air supply and in connection with he apparatuses I have built and operated in accordance with the present invention I have found the type of air-regulating valve shown in Figs. 36 and 37 to be most satisfactory. This valve permits a substantially unrestricted supply of air to be admitted to the cylinders from full load to about half load and below that point restricts the air supply so that the ratio of air to fuel remains substantially constant from half load to no load.

Referring now to the figures, the valve comprises a body 142 forming a chamber 143 communicating with the inlet end 144 of the manifold which terminates in the air passages leading to the individual cylinders of the engine. Chamber 143 is in communication with the atmosphere by way of the passage 145 and the casing 142 forms a pair of spaced cylindrical valve ports 146 and 147, the latter being of smaller diameter than the former. A hollow piston-valve 148, having a lower cylindrical flange 149 adapted to close port 147 and an upper flange 150 adapted to close port 146, is guided by means of the cylindrical extension 151 sliding in the lower extension of the casing 142. Casing 142, forming a second chamber 152 communicating by way of port 147 with chamber 143, is placed in communication with the inlet 145 by means of ports 153 formed in the lower part of valve 148. Valve 148 is provided at its upper end with a number of wings 154 acting to guide the valve when it is lowered to open the port 146.

The bottom of casing 142 forms a guide 155 for the stem 156. A stud 157 passing through the bottom of the piston valve 148 is screwed into the top of stem 156. The upper end of stem 156 is extended to form a spring retaining disk 158 between which and the bottom of valve 148 is located the spring 159 which acts to lift valve 148 and to hold the valve and the stem 156 in the relative positions shown in Fig. 37.

By reference to Figs. 29 and 35 it will be seen that the air-control valve is mounted so that the lower end of the stem 156 which terminates in an adjustable tip 160, is adapted to be lifted by movement of the lever 123 which controls the length of stroke of the fuel pump.

Fig. 37 illustrates the valve in fully open position and when it is in this position the spring 159 is held in very light compression by stud 157, which it will be seen may be adjusted to vary the initial compression on the spring. The arrangement of lever 123 is such that when the lever 124 is in a position permitting full stroke operation of the fuel pump, the valve 148 is permitted to drop to the position shown in Fig. 37. When not supported by the control lever 123, the air valve assembly will move to this position due to gravity, and, if the engine is running, due to the unbalanced pressure set up by suction in the inlet manifold. When the valve is in this position the free area through the ports 146 and 147 is such that an unrestricted supply of air flows to the inlet end 144 of the intake manifold. If lever 123 is lifted to shorten the pump stroke and cut down the amount of fuel injected as the load on the engine decreases, the stem 156 is lifted and the valve 148 is also lifted by means of spring 159. Upward movement of the stem 156 effected by altering the lever 123 from full load position to substantially half load position does not cause valve 148 to exert any throttling effect on the air being drawn through the valve. Continued upward movement of stem 156 beyond this point, however, reduces the free area through the ports 146 and 147 to a point causing throttling of the air flow to be effected. This throttling creates a differential pressure between the air passage 145 and the inlet end of manifold 144 and by reference to the figures it will be seen that this differential pressure causes an unbalanced downwardly directed force to be exerted on the valve due to the fact that the port 146 is of greater area than the port 147. The resistance to upward movement of the valve set up by this differential pressure tends to compress spring 159 and the strength of this spring is chosen, with respect to the unbalanced air pressure exerted on the valve, so that when the stem 156 is lifted by movement of the control lever 123 to a position resulting in no injection at the nozzle the spring will cause valve 148 to close. Theoretically, in this position, the unbalanced pressure on the valve is equal to the unbalanced area times full atmospheric pressure, since under the assumed conditions, with the valve closed, pressure in the passage 144 would be reduced to absolute vacuum by engine suction. For example, with the valve in the closed position shown in Fig. 36, the compressed spring 159 should exert a pressure equal to one atmosphere when used with a valve the unbalanced area of which is unity. From the above it will be seen that by this arrangement an unrestricted air supply is permitted to reach the engine cylinders throughout the upper portion of the load range, while in the lower portion of the load range the ratio of air to fuel supplied to the cylinders is held constant or substantially constant, since as the control lever 123 is progressively lifted to cut down the amount of fuel injected, the air valve is also progressively closed. This maintenance of the constant ratio of air to fuel under varying load conditions is irrespective of engine speed because of the fact that the position of valve 148 is determined not only by the position of the stem 156, which varies with variations in load, but is also determined by the magnitude of the unbalanced air pressure acting against the spring 159. The unbalanced air pressure is a function of the speed of the engine as well as of the degree of throttling through the air valve 156. In a given position, say, for example, at one-quarter engine load, the position of valve 148 will change with variations in engine speed so as to maintain the air-fuel ratio at a substantially constant figure.

I have used a double ported valve of the type illustrated merely in order to reduce the total amount of unbalanced pressure against which the control mechanism must operate and it will be clear that the principle of operation of the valve will in no wise be altered if a single seated valve is used.

The air valve adjustment necessary to secure the maximum efficiency at all loads with a given engine may vary somewhat, but I have found by experience that in general, efficient operation may be secured with a valve setting such as I have used on the engine described in connection with Figs. 29 to 37. In this case the maximum pump stroke is approximately 3 millimeters and the valve is set so that the air valve effects no throttling until the pump stroke is reduced to about 1.3 mm. Reduction of the pump stroke from 1.3 mm. to about 1.1 mm. causes the valve to reduce the pressure in the intake manifold from atmospheric (assumed to be 760 mm. of mercury) to a pressure of about 550 mm. of mercury, and continued reduction of the pump stroke to a value giving no injection (which as previously pointed out may not be no-stroke) causes the valve to reduce the air pressure in the manifold to zero, in proportion to the amount of reduction in the pump stroke. It is in order to provide the desired pressure drop at about half load that the spring 159 is set under an initial tension by adjustment of the stud 157.

The refinement of air adjustment just described is not essential to the successful operation of an engine in accordance with the broad method of operation disclosed herein, but serves to illustrate what I consider as an important feature contributing to the securing of high thermal efficiency, particularly at low loads. Furthermore, the method and means of air adjustment hereinabove described is applicable to engines employing methods and means for charge forming other than those herein claimed, and is claimed broadly in my copending application Serial No. 404,912 filed November 5, 1929.

From the foregoing description it will be apparent that many variations, both in method and in forms of apparatus, may be made without departing from the spirit or scope of the present invention as defined in the appended claims.

What I claim is:

1. The method of forming and burning a compressed fuel charge in an internal combustion engine employing a timed ignition system having a point of local ignition which comprises providing a confined atmosphere of air, compressing the confined air, causing a regular movement of the air past said ignition point during the period of compression, injecting finely divided fuel into the moving air during the latter part of the compression stroke to impregnate a portion of the air with fuel, and igniting said portion when it is in the vicinity of said ignition point.

2. The method of forming and burning a compressed fuel charge in an internal combustion engine employing a timed ignition system having a point of local ignition which comprises providing a confined atmosphere of air, compressing the confined air, causing a regular movement of the air past the ignition point during the period of compression, progressively impregnating successive volumetric increments of the moving air to form a combustible charge by injecting finely divided fuel into said air during the latter part of the compression period, and igniting said charge when a predetermined portion thereof is in the vicinity of said ignition point.

3. The method of forming and burning a compressed fuel charge in an internal combustion engine employing a timed ignition system having a point of local ignition which comprises providing a confined atmosphere of air, compressing the confined air, causing a regular movement of the air past the ignition point during the period of compression, progressively impregnating successive volumetric increments of the moving air to form a combustible charge by injecting finely divided fuel into said air transversely of the direction of movement thereof during the latter part of the compression period, and igniting said charge when a predetermined portion thereof is in the vicinity of said ignition point.

4. The method of forming and burning a compressed fuel charge in an internal combustion engine employing a timed ignition system having a point of local ignition which comprises providing a confined atmosphere of air, compressing the confined air, causing rotation of the confined air past the ignition point during the period of compression, progressively impregnating successive volumetric increments of the rotating air to form a combustible charge by injecting finely divided fuel into said air during the latter portion of the compression period, and igniting said charge when a predetermined portion thereof is in the vicinity of said ignition point.

5. The method of forming and burning a compressed fuel charge in an internal combustion engine employing a timed ignition system having a point of local ignition which comprises providing a confined atmosphere of air, compressing the confined air, causing rotation of the confined air past the ignition point during the period of compression, progressively impregnating successive volumetric increments of the rotating air to form a combustible charge by injecting finely divided fuel into said air along a path transversely intersecting the circular path of movement of the air during the latter portion of the compression period, and igniting said charge when a predetermined portion thereof is in the vicinity of said ignition point.

6. The method of forming and burning a compressed fuel charge in an internal combustion engine employing a timed ignition system having a point of local ignition which comprises providing a confined atmosphere of air, compressing the confined air, causing rotation of the confined air past the ignition point during the period of compression, progressively impregnating successive volumetric increments of the rotating air to form a combustible charge by injecting finely divided fuel into said air along a chord intersecting the circular path of movement of the air during the latter portion of the compression period, and igniting said charge when a predetermined portion thereof is in the vicinity of said ignition point.

7. The method of forming and burning a compressed fuel charge in an internal combustion engine employing a timed ignition system having a point of local ignition which comprises providing a confined atmosphere of air, compressing the confined air, causing a regular movement of the air past the ignition point during the period of compression, progressively impregnating variable volumetric percentages of the moving air dependent on the engine load to form a combustible charge by injecting finely divided fuel into said air during the latter portion of the compression period, and igniting said charge when the portion thereof formed under all conditions of load on the engine is in the vicinity of said ignition point.

8. The method of forming and burning a compressed fuel charge in an internal combustion engine employing a timed ignition system having a point of local ignition which comprises providing a confined atmosphere of air, compressing the confined air, causing rotation of the confined air past the ignition point during the period of compression, progressively impregnating variable volumetric percentages of the rotating air dependent on the engine load to form a combustible charge by injecting finely divided fuel into said air during the latter part of the compression period, and igniting said charge when the portion thereof formed under no-load operating conditions of the engine is in the vicinity of said ignition point.

9. The method of forming and burning a compressed fuel charge in an internal combustion engine employing a timed ignition system having a point of local ignition which comprises providing a confined atmosphere of air, compressing the confined air, causing rotation of the confined air past the ignition point during the period of compression, progressively impregnating variable volumetric percentages of the rotating air dependent on the engine load to form a combustible charge by injecting finely divided fuel along a chord intersecting the circular path of movement of the air during the latter portion of the compression period, and igniting said charge when the portion thereof which is formed under all conditions of engine load is in the vicinity of said ignition point.

10. The method of forming and burning a compressed fuel charge in an internal combustion engine employing a timed ignition system having a point of local ignition which comprises providing a confined atmosphere of air, compressing the confined air, causing rotation of the confined air past the ignition point during the period of compression, progressively impregnating variable volumetric percentages of the rotating air dependent on the engine load to form a combustible charge by injecting finely divided fuel into said air during the latter part of the compression period, terminating the period of fuel injection at the same point in the engine cycle under all conditions of engine load, and igniting said charge when a predetermined portion thereof is in the vicinity of said ignition point.

11. The method of forming and burning a charge of compressed fuel charge in an internal combustion engine employing a timed ignition system having a point of local ignition which comprises providing a confined atmosphere of air, compressing the confined air, causing rotation of the confined air past the ignition point during the period of compression, progressively impregnating variable volumetric percentages of the rotating air dependent on the engine load to form a combustible charge by injecting finely divided fuel into said air during the latter part of the compression period, terminating the period of fuel injection under all conditions of engine load before ignition, and igniting said charge when the portion thereof formed under all conditions of engine load is in the vicinity of said ignition point.

12. The method of forming and burning a compressed fuel charge in an internal combustion engine employing a timed ignition system having a point of local ignition which comprises providing a confined atmosphere of air, compressing the confined air, causing rotation of the confined air past the ignition point during the period of compression, progressively impregnating variable volumetric percentage of the rotating air dependent on the engine load to form a combustible charge by injecting finely divided fuel into said air during the latter part of the compression period, terminating the period of fuel injection at the same point in the engine cycle under all conditions of engine load, and then igniting said charge when it is in the vicinity of the ignition point.

13. The method of forming and burning a compressed fuel charge in an internal combustion engine employing a timed ignition system having a point of local ignition which comprises providing a confined atmosphere of air, compressing the confined air, causing rotation of the confined air past the ignition point during the period of compression, progressively impregnating variable volumetric percentages of the rotating air dependent on the engine load to form a combustible charge by injecting finely divided fuel into said air during the latter part of the compression period, varying the time of commencement of fuel injection with variations in the load on the engine, terminating the period of fuel injection at the same point in the engine cycle under all conditions of engine load, and then igniting said charge when it is in the vicinity of the ignition point.

14. The method of forming and burning a compressed fuel charge in an internal combustion engine employing a timed ignition system having a point of local ignition which comprises providing a confined atmosphere of air, compressing the confined air, causing rotation of the confined air past the ignition point during the period of compression, progressively impregnating variable volumetric percentages of the rotating air dependent on the engine load to form a combustible charge by injecting finely divided fuel into said air during the latter part of the compression period, varying the time of commencement of fuel injection with variations in the load on the engine, terminating the period of fuel injection at the same point in the engine cycle under all conditions of engine load, and then igniting said charge when the portion of the air last impregnated is in the vicinity of the ignition point.

15. The method of forming and burning a compressed fuel charge in an internal combustion engine employing a timed ignition system having a point of local ignition which comprises providing a confined atmosphere of air, compressing the confined air, causing a regular movement of the air past the ignition point during the period of compression, concurrently impregnating a plurality of different successive volumetric increments of the moving air by concurrently injecting a plurality of spaced jets of finely divided fuel into said air during the latter part of the compression period, and burning the charge by igniting the part thereof impregnated by fuel from one jet when said part is in the vicinity of said ignition point.

16. The method of forming and burning a compressed fuel charge in an internal combustion engine employing a timed ignition system having a point of local ignition which comprises providing a confined atmosphere of air, compressing the confined air, causing rotation of the confined air past the ignition point during the period of compression, concurrently impregnating two spaced parts of the rotating air by concurrently injecting two spaced jets of finely divided fuel into said air during the latter part of the compression period, and burning the charge by igniting the part thereof impregnated by fuel from one of said jets when said part is in the vicinity of said ignition point.

17. The method of forming and burning a compressed fuel charge in an internal combustion engine employing a timed ignition system having a point of local ignition which comprises providing a confined atmosphere of air, causing rotation of said air past said point, progressively impregnating said rotating air with finely divided fuel before it passes said point to form a combustible charge, and relating the speed of air rotation, the time of injection and the time of ignition so that ignition occurs when a predetermined portion of said charge is in the vicinity of said ignition point.

18. The method of forming and burning a compressed fuel charge in an internal combustion engine employing a timed ignition system having a point of local ignition which comprises providing a confined atmosphere of air, causing rotation of said air past said point, progressively impregnating variable volumetric percentages of said rotating air dependent on load on the engine with finely divided fuel to form a combustible charge, and relating the speed of air rotation, the time of fuel injection and the time of ignition so that ignition occurs when the portion of the charge formed under all conditions of engine load is in the vicinity of said ignition point.

19. The method of forming and burning a compressed fuel charge in an internal combustion engine employing a timed ignition system having a point of local ignition which comprises providing a confined atmosphere of air, causing rotation of said air past said point, progressively impregnating said rotating air with finely divided fuel before it passes said point to form a combustible charge, and relating the speed of air rotation, the time of injection and the time of ignition so that ignition occurs when the portion of said air last impregnated is in the vicinity of said ignition point.

20. The method of forming and burning a compressed fuel charge in an internal combustion engine employing a timed ignition system having a point of local ignition which comprises providing a confined atmosphere of air, causing rotation of said air past said point, progressively impregnating variable volumetric percentages of said rotating air dependent on load on the engine with finely divided fuel to form a combustible charge, and relating the speed of air rotation, the time of fuel injection and the time of ignition so that ignition occurs when the portion of said air last impregnated is in the vicinity of said ignition point.

21. The method of operating an internal combustion engine having a combustion chamber and employing a timed ignition system providing a point of local ignition in said chamber which comprises introducing air and causing rotation thereof in said chamber, forcing a jet of finely divided fuel into the rotating air so that volumetric percentages of the air, variable with the load on the engine, first pass once through the jet to form a combustible charge and then pass said ignition point, and igniting said charge when the portion thereof formed under all conditions of engine load is in the vicinity of said ignition point.

22. The method of operating an internal combustion engine having a combustion chamber and employing a timed ignition system providing a point of local ignition in said chamber which comprises introducing air and causing rotation thereof in said chamber at a speed substantially proportional to engine speed, injecting finely divided fuel into the rotating air in said chamber at a rate directly in accordance with engine speed during a period of the engine cycle proportional to the load on the engine and in a direction such that the rotating air traverses the path of movement of the injected fuel to form a combustible charge, limiting the period of fuel injection for normal full load operation to a value below that at which the air would rotate more than once in said chamber, whereby no part of the rotating air in the chamber passes more than once through the injected fuel under any normal conditions of load on the engine, and igniting said charge.

23. The method of operating a low-compression internal combustion engine having a combustion chamber and employing a timed electrical ignition system which comprises introducing air and causing rotation thereof in said chamber at a speed substantially proportional to engine speed, injecting finely divided fuel into the rotating air at a rate proportional to engine speed to form a combustible charge, varying the length of the period of injection in accordance with variations in load on the engine, terminating the period of injection at a fixed point in the engine cycle under all conditions of load on the engine, and then igniting said charge.

24. The method of forming and burning a compressed fuel charge at part load in an internal combustion engine having a combustion chamber and employing an ignition system providing a point of timed local ignition, which comprises introducing air into the combustion chamber, injecting finely divided fuel into a localized part of said air during the latter part of the compression period of the engine cycle to form a combustible mixture of fuel and air substantially segregated within a segmental portion of the chamber, and causing movement of the segregated mixture without material diffusion thereof to the vicinity of said point at the time of ignition.

25. An internal combustion engine comprising means providing a combustion chamber, means providing an opening for the admission of combustion air to the chamber, means providing timed electrical ignition in the chamber, means for injecting finely divided fuel at part load into a part of the air in the combustion chamber to form in said part a localized combustible mixture of fuel and air, and means independent of the fuel injecting means for causing movement of said localized mixture without material diffusion thereof to the vicinity of the ignition means at the time of ignition.

26. An internal combustion engine comprising means providing a combustion chamber, means providing an opening for the admission of combustion air to the chamber, means providing timed electrical ignition in the chamber, means for injecting finely divided fuel into said chamber, said means being disposed with relation to the combustion chamber and the ignition means to form at part load a localized combustible mixture of fuel and air away from the ignition means, and means independent of the fuel injecting means for causing movement of said localized mixture without material diffusion thereof to the vicinity of the ignition means at the time of ignition.

27. An internal combustion engine comprising means providing a combustion chamber, means providing an opening for the admission of combustion air to the chamber, means providing timed electrical ignition in the chamber, means for injecting finely divided fuel at part load, during the latter part of the compression period of the engine cycle and just prior to the time of ignition, into a part of the air in the combustion chamber to form in said part a localized combustible mixture of fuel and air, and means independent of the fuel injecting means for causing movement of said localized mixture without material diffusion thereof to the vicinity of the ignition means at the time of ignition.

28. An internal combustion engine comprising a cylinder and a piston providing a combustion chamber, a valve providing an opening for admitting combustion air to the chamber, a spark plug in the chamber for providing timed ignition, a fuel injecting device for injecting finely divided fuel at part load into a localized part of the air in the combustion chamber away from said plug to form a combustible mixture of fuel and air substantially segregated with respect to the remainder of the air in the chamber, and means associated with said valve for causing movement of said segregated mixture without material diffusion thereof to the vicinity of said plug at the time of ignition.

29. In an internal combustion engine having a combustion chamber, means for introducing air and causing rotation thereof in said chamber, means for compressing the rotating air in said chamber, means for injecting finely divided fuel at part load radially into the rotating air during the latter portion of the compression period to form a combustible charge substantially segregated in a localized part of the rotating air, and a device for igniting said charge, said device being timed to ignite said segregated charge upon movement of the latter to the vicinity of the device due to rotation of the air.

30. In an internal combustion engine having a combustion chamber, means for introducing air and causing rotation thereof in said chamber, means for compressing the rotating air in said chamber, means for injecting finely divided fuel into said chamber radially from the axis of rotation of the air in a plurality of jets during the latter portion of the compression period to form a combustible charge comprising a plurality of parts each substantially segregated within a localized part of the rotating air, and a device for igniting said charge, said device being located in said chamber between the radial planes defining the paths of injection of two of said jets and being timed to ignite the charge upon movement of one of the segregated parts of the charge to the vicinity of the device due to rotation of the air.

31. An internal combustion engine comprising means providing a combustion chamber, means providing openings for admitting combustion air to and exhausting combustion gases from the chamber, means providing timed electrical ignition in the chamber, means located adjacent to the central axis of the chamber for injecting finely divided fuel at part load radially into a part of the air in the combustion chamber to form in said part a localized combustible mixture of fuel and air, and means independent of the fuel injecting means for causing movement of said localized mixture without material diffusion thereof to the vicinity of the ignition means at the time of ignition.

32. An internal combustion engine comprising a cylinder having a head, inlet and exhaust valves in said head, a piston in said cylinder comprising a peripheral flange forming the side wall of a combustion chamber when the piston is at the inner end of its stroke, said flange having a slot therein, a spark plug mounted in the cylinder so as to project into said slot when the piston is at the inner end of its stroke, a fuel injecting nozzle mounted in the cylinder head substantially centrally of the chamber for injecting finely divided fuel at part load radially into a part of the air in the combustion chamber to one side of said slot to form in said part a localized combustible mixture of fuel and air, and means associated with the inlet valve for causing air admitted to the combustion chamber to rotate so as to move said localized mixture without material diffusion thereof to the vicinity of the plug at the time of ignition.

33. In an internal combustion engine comprising a cylinder having a head, inlet and exhaust valves in said head, a piston in said cylinder comprising a peripheral flange forming the side wall of a combustion chamber when the piston is at the inner end of its stroke, said flange having a slot therein, a spark plug mounted in the cylinder so as to project into said slot when the piston is at the inner end of its stroke, a fuel injecting nozzle mounted in the cylinder head substantially centrally of the chamber, said nozzle comprising an orifice positioned to direct a jet of finely divided fuel radially of the combustion chamber toward a portion of said flange adjacent to one side of the slot receiving said plug, means associated with the inlet valve for causing air admitted to the combustion chamber to rotate in a direction such that it first intersects the line of injection of said jet and then passes the plug, and means for supplying fuel to said nozzle only when said piston is adjacent to the inner end of its stroke, said last named means being timed to cause the injected fuel to be carried by the rotating air to the vicinity of said plug at the time of ignition.

34. In an internal combustion engine comprising a cylinder, means forming a combustion chamber in the shape of a body of revolution in communication with said cylinder, the axis of said chamber being angularly disposed with respect to the axis of the cylinder, means for introducing air and causing rotation thereof in said chamber about the axis of the chamber during the compression stroke of the engine, means for injecting finely divided fuel at part load into a part of the air in the combustion chamber to form in said part a localized combustible mixture of fuel and air, and a device in said chamber for igniting said mixture, said device being timed to ignite said localized mixture upon movement thereof to the vicinity of the device due to rotation of the air.

35. In an internal combustion engine, a cylinder, means forming a combustion chamber in the shape of a body of revolution in communication with said cylinder the axis of said chamber being angularly disposed with respect to the axis of the cylinder, means for introducing air and causing rotation thereof in said chamber about the axis of the chamber during the compression stroke of the engine, means for injecting finely divided fuel into said chamber at part load radially from the axis of rotation of the air in a plurality of jets to form a combustible charge comprising a plurality of parts each substantially segregated within a localized part of the rotating air, and a device for igniting said charge, said device being located in said chamber between the radial planes defining the paths of injection of two of said jets and being timed to ignite the charge upon movement of one of the segregated parts thereof to the vicinity of the device due to rotation of the air.

36. The method of forming and burning a compressed fuel charge in an internal combustion engine employing a timed ignition system having a point of local ignition which comprises providing a confined atmosphere of air, compressing the confined air, causing a regular movement of the air past the ignition point during the period of compression, progressively impregnating variable volumetric percentages of the moving air dependent on the engine load to form a combustible charge by injecting finely divided fuel into said air during the latter portion of the compression period, regulating the quantity of air provided to maintain the ratio of fuel to air substantially constant at all engine loads below a predetermined value of engine load, and igniting said charge when the portion thereof formed under all conditions of load on the engine is in the vicinity of said ignition point.

37. The method of operating an internal combustion engine having a combustion chamber and employing a timed ignition system providing a point of local ignition in said chamber which comprises introducing air and causing rotation thereof in said chamber, forcing a jet of finely divided fuel into the rotating air so that volumetric percentages of the air, variable with the load on the engine, first pass once through the jet to form a combustible charge and then pass said ignition point, regulating the quantity of air introduced into said chamber to maintain the ratio of fuel to air substantially constant at all engine loads below a predetermined value of engine load, and igniting said charge.

38. The method of operating an internal combustion engine having a combustion chamber and employing a timed ignition system providing a point of local ignition in said chamber which comprises introducing air and causing rotation of same in said chamber at a speed substantially proportional to engine speed, injecting finely divided fuel into the rotating air in said chamber at a rate directly in accordance with engine speed during a period of the engine cycle proportional to the load on the engine and in a direction such that the rotating air traverses the path of movement of the injected fuel to form a combustible charge, regulating the quantity of air introduced into said chamber to maintain the ratio of fuel to air substantially constant at all engine loads below a predetermined value of engine load, limiting the period of fuel injection for normal full load operation to a value below that at which the air would rotate more than once in said chamber, whereby no part of the rotating air in the chamber passes more than once through the injected fuel under any normal conditions of load on the engine, and igniting said charge.

39. The method of operating an internal combustion engine having a combustion chamber and employing a timed ignition system providing a point of local ignition in said chamber which comprises introducing air and causing rotation thereof in said chamber at a speed substantially proportional to engine speed, injecting finely divided fuel into the rotating air in said chamber at a rate directly in accordance with engine speed during a period of the engine cycle proportional to the load on the engine and in a direction such that the rotating air traverses the path of movement of the injected fuel to form a combustible charge, regulating the quantity of air introduced into said chamber to maintain the ratio of fuel to air substantially constant at all engine speeds and at all engine loads below a predetermined value of engine load, limiting the period of fuel injection for normal full load operation to a value below that at which the air would rotate more than once in said chamber, whereby no part of the rotating air in the chamber passes more than once through the injected fuel under any normal conditions of load on the engine, and igniting said charge.

40. An internal combustion engine comprising means providing a combustion chamber, means providing an opening for admitting to said chamber at part load on the engine a restricted quantity of combustion air, means for exhausting combustion gases from the chamber, means providing timed electrical ignition in the chamber, means for injecting finely divided fuel at part load into a part of the air in the combustion chamber to form in said part a localized combustible mixture of fuel and air, and means independent of the fuel injecting means for causing movement of said localized mixture without material diffusion thereof to the vicinity of the ignition means at the time of ignition.

41. An internal combustion engine comprising means providing a combustion chamber, means providing openings for admitting combustion air to and exhausting combustion gases from the chamber, means providing timed electrical ignition in the chamber, adjustable means for injecting finely divided fuel at part load into a part of the air in the combustion chamber to form in said part a localized combustible mixture of fuel and air, means responsive to variations in engine speed and to variations in adjustment of the fuel injecting means for restricting the quantity of combustion air admitted to the chamber, and means independent of the fuel injecting means for causing movement of said localized mixture without material diffusion thereof to the vicinity of the ignition means at the time of ignition.

42. In an internal combustion engine having a combustion chamber means for introducing air and causing rotation thereof in said chamber, means for compressing the rotating air, means for injecting finely divided fuel into the rotating air during compression thereof, means for varying the quantity of fuel injected in accordance with variation in the load on the engine, and means for maintaining the ratio of air and fuel admitted to said chamber substantially constant at all engine loads below a predetermined value of engine load.

43. In an internal combustion engine having a combustion chamber means for introducing air and causing rotation thereof in said chamber, means for compressing the rotating air, means for injecting finely divided fuel into the rotating air during compression thereof, means for varying the quantity of fuel injected in accordance with variations in the load on the engine, and means responsive to variations in speed of the engine and to actuation of the means for varying the quantity of fuel injected for maintaining the ratio of air and fuel admitted to said chamber substantially constant at all engine speeds and at all engine loads below a predetermined value of engine load.

44. In an internal combustion engine having a combustion chamber, means for introducing air and causing rotation thereof in said chamber, means for compressing the rotating air, a nozzle for injecting finely divided fuel into the rotating air to form a combustible charge, a plunger pump arranged to supply fuel to said nozzle at a rate proportioned to engine speed, mechanism acting on said plunger for controlling the length of the period of fuel injection, a valve for regulating the quantity of air introduced into said chamber, a spring for closing said valve against flow of air to said chamber, means responsive to actuation of said mechanism for varying the force exerted by said spring, and means for igniting said charge.

45. In an internal combustion engine, a cylinder, a piston for drawing air into the cylinder and compressing it therein, an inlet valve having a skirt for causing rotation of the air drawn into the cylinder, a nozzle for injecting finely divided fuel into the rotating air to form a combustible charge, a plunger pump arranged to supply fuel to said nozzle at a rate proportional to engine speed, mechanism for altering the length of the suction stroke of the pump to vary the length of the period of fuel injection, a valve for regulating the quantity of air supplied to said cylinder, a spring arranged to close the valve against the action of the air being drawn into the cylinder and tending to open the valve, means operating in response to actuation of said mechanism during a predetermined range of movement thereof for altering the force exerted by said spring, and means for igniting said charge.

46. The method of forming and burning a compressed fuel charge in an internal combustion engine employing a timed ignition system having a point of local ignition which comprises providing a confined atmosphere of air, compressing the confined air, causing a regular movement of the air past the ignition point during the period of compression, progressively impregnating variable volumetric percentages of the moving air dependent on the engine load to form a combustible charge by injecting finely divided fuel into said air during the latter portion of the compression period, and igniting said charge when the air first impregnated with fuel is in the vicinity of said ignition point.

47. The method of forming and burning a compressed fuel charge in an internal combustion engine employing a timed ignition system having a point of local ignition which comprises providing a confined atmosphere of air, compressing the confined air, causing rotation of the confined air past the ignition point during the period of compression, progressively impregnating variable volumetric percentages of the rotating air dependent on the engine load to form a combustible charge by injecting finely divided fuel into said air during the latter part of the compression period, and igniting said charge when the air first impregnated with fuel is in the vicinity of said ignition point.

48. The method of forming and burning a compressed fuel charge in an internal combustion engine employing a timed ignition system having a point of local ignition which comprises providing a confined atmosphere of air, compressing the confined air, causing rotation of the confined air past the ignition point during the period of compression, progressively impregnating variable volumetric percentages of the rotating air dependent on the engine load to form a combustible charge by injecting finely divided fuel into said air during the latter part of the compression period, commencing the period of fuel injection at the same point in the engine cycle under all conditions of engine load, and igniting said charge when a predetermined portion thereof is in the vicinity of said ignition point.

49. The method of forming and burning a compressed fuel charge in an internal combustion engine employing a timed ignition system having a point of local ignition which comprises providing a confined atmosphere of air, causing rotation of said air past said point, progressively impregnating said rotating air with finely divided fuel before it passes said point to form a combustible charge, and relating the speed of air rotation, the time of injection and the time of ignition so that ignition occurs when the portion of said air first impregnated is in the vicinity of said ignition.

50. The method of forming and burning a compressed fuel charge in an internal combustion engine employing a timed ignition system having a point of local ignition which comprises providing a confined atmosphere of air, causing rotation of said air past said point, progressively impregnating variable volumetric percentages of said rotating air dependent on load on the engine with finely divided fuel to form a combustible charge, and relating the speed of air rotation, the time of fuel injection and the time of ignition so that ignition occurs when the portion of said air first impregnated is in the vicinity of said ignition point.

51. The method of forming and burning a compressed fuel charge in an internal combustion engine employing a timed ignition system having a point of local ignition which comprises providing a confined atmosphere of air, compressing the confined air, causing a regular movement of the air past the ignition point during the period of compression, injecting finely divided fuel into the moving air during the latter portion of the compression period to form a combustible charge, varying the length of the period of injection to progressively impregnate variable volumetric percentages of the moving air dependent upon the engine load, injecting fuel for no-load operation of the engine at a fixed point in the engine cycle, said point being between the points of commencement and termination of the injection period at full load, and igniting the charge.

52. The method of forming and burning a compressed fuel charge in an internal combustion engine employing a timed ignition system having a point of local ignition which comprises providing a confined atmosphere of air, compressing the confined air, causing a regular movement of the air past the ignition point during the period of compression, injecting finely divided fuel into the moving air during the latter portion of the compression period to form a combustible charge, varying the length of the period of injection to progressively impregnate variable volumetric percentages of the moving air dependent upon the engine load, injecting fuel for no-load operation of the engine at a fixed point in the engine cycle, said point being substantially midway between the points of commencement and termination of the period of injection at full load, and igniting the charge.

53. The method of forming and burning a compressed fuel charge in an internal combustion engine employing a timed ignition system having a point of local ignition which comprises providing a confined atmosphere of air, compressing the confined air, causing rotation of the confined air past the ignition point during the period of compression, progressively impregnating successive volumetric percentages of the rotating air to form a combustible charge by injecting finely divided fuel into said rotating air radially from the axis of rotation of the air during the latter portion of the compression period, and igniting said charge when a predetermined portion thereof is in the vicinity of said ignition point.

54. An internal combustion engine comprising a cylinder having a head, inlet and exhaust valves in said head, a piston in said cylinder comprising a peripheral flange forming the side wall of a combustion chamber when the piston is at the inner end of its stroke, said flange having a slot therein, a fuel injecting nozzle mounted in the cylinder so as to register with said slot when the piston is at the inner end of its stroke, a spark plug having electrodes situated in the combustion chamber at a point remote from said nozzle, said nozzle comprising an orifice positioned to direct a jet of finely divided fuel transversely of the combustion chamber along a chord thereof toward a portion of said flange to one side of said plug, whereby to form a combustible charge to one side of said plug, and means associated with the inlet valve for causing rotation of the air admitted to the combustion chamber, said plug being timed to provide ignition when a portion of the charge is in the vicinity of said electrodes.

55. An internal combustion engine comprising a cylinder having a head, inlet and exhaust valves in said head, a piston in said cylinder comprising a peripheral flange forming the side wall of a combustion chamber when the piston is at the inner end of its stroke, said flange having a slot therein, a fuel injecting nozzle mounted in the cylinder so as to register with said slot when the piston is at the inner end of its stroke, a spark plug having electrodes situated in the combustion chamber at a point remote from said nozzle, said nozzle comprising an orifice positioned to direct a jet of finely divided fuel transversely of the combustion chamber along a chord thereof toward a portion of said flange to one side of said plug and adjacent thereto, whereby to form a combustible charge adjacent to said plug, and means associated with the inlet valve for causing air admitted to the combustion chamber to rotate in a direction such that it first intersects the line of injection of said jet and then passes said plug, said plug being timed to provide ignition when a portion of the charge is in the vicinity of said electrodes.

56. An internal combustion engine comprising a cylinder having a head, inlet and exhaust valves in said head, a piston in said cylinder comprising a peripheral flange forming the side wall of a combustion chamber when the piston is at the inner end of its stroke, said flange having a slot therein, a fuel injecting nozzle mounted in the cylinder so as to register with said slot when the piston is at the inner end of its stroke, a spark plug having electrodes situated in the combustion chamber at a point remote from said nozzle, said nozzle comprising an orifice positioned to direct a jet of finely divided fuel transversely of the combustion chamber along a chord thereof toward a portion of said flange to one side of said plug and adjacent thereto, whereby to form a combustible charge adjacent to said plug, and means associated with the inlet valve for causing air admitted to the combustion chamber to rotate in a direction such that it first intersects the line of injection of said jet and then passes said plug, and means for supplying fuel to said nozzle only when said piston is adjacent to the inner end of its stroke, said plug being timed to provide ignition when a portion of the charge is in the vicinity of said electrodes.

57. The method of forming and burning a compressed fuel charge at part load in an internal combustion engine having a combustion chamber and employing an ignition system providing a point of timed local ignition, which comprises introducing air into the combustion chamber, injecting finely divided fuel into a localized part of said air within a segmental portion of the chamber during the latter part of the compression period of the engine cycle to form in said part a mixture of fuel and air of relatively high fuel concentration with respect to the remainder of the contents of the chamber and causing movement of said mixture of relatively high fuel concentration to the vicinity of said point at the time of ignition.

58. An internal combustion engine comprising means providing a combustion chamber, means providing an opening for the admission of combustion air to the chamber, means providing timed electrical ignition in the chamber, means for injecting finely divided fuel at part load into a part of the air in the combustion chamber to form in said part a mixture of relatively high fuel concentration with respect to the remainder of the contents of the chamber and means independent of the fuel injecting means for moving said mixture of relatively high fuel concentration to the vicinity of the ignition means at the time of ignition.

59. An internal combustion engine comprising means providing a combustion chamber, means providing an opening for the admission of combustion air to the chamber, means providing timed electrical ignition in the chamber, adjustable means for injecting finely divided fuel at part load into a part of the air in the combustion chamber to form in said part a mixture of relatively high fuel concentration with respect to the remainder of the contents of the chamber, means responsive to variations in engine speed and to variations in adjustment of the fuel injecting means for restricting the quantity of combustion air admitted to the chamber so as to maintain a substantially constant ratio of fuel to air at different values of part load on the engine, and means independent of the fuel injecting means for moving said mixture of relatively high fuel concentration to the vicinity of the ignition means at the time of ignition.

60. An internal combustion engine comprising means providing a combustion chamber, means providing an opening for the admission of combustion air to the chamber, means providing timed electrical ignition in the chamber, adjustable means for injecting finely divided fuel at part load into a part of the air in the combustion chamber to form in said part a mixture of relatively high fuel concentration with respect to the remainder of the contents of the chamber, means responsive to variations in engine speed and to variations in adjustment of the fuel injecting means for restricting the quantity of combustion air admitted to the chamber so as to maintain a substantially constant ratio of fuel to air throughout the range of engine loads between idling load and approximately half normal full load, and means independent of the fuel injecting means for moving said mixture of relatively high fuel concentration to the vicinity of the ignition means at the time of ignition.

In testimony whereof I have hereunto affixed my signature.

KNUT JONAS ELIAS HESSELMAN.

CERTIFICATE OF CORRECTION.

Patent No. 1,835,490.                               Granted December 8, 1931, to

KNUT JONAS ELIAS HESSELMAN.

It is hereby certified that error appears in the printed specification of the above numbered patent requiring correction as follows: Page 2, line 117, strike out the word "is"; page 10, lines 14 and 15, strike out the words "the plunger to fix the moment of beginning of the injection"; page 11, line 68, after the numeral "75" strike out the comma and insert same to follow "75" in line 70, and line 92, for the misspelled word "baes" read base; page 12, line 11, for the numeral "98" read 97a; page 23, line 119, claim 49, after "ignition" insert the word point; and that the said Letters Patent should be read with these corrections therein that the same may conform to the record of the case in the Patent Office.

Signed and sealed this 23rd day of February, A. D. 1932.

(Seal)

M. J. Moore,
Acting Commissioner of Patents.